United States Patent
Karasudani et al.

(10) Patent No.: US 6,701,061 B2
(45) Date of Patent: Mar. 2, 2004

(54) ENDLESS VIDEO RECORDING APPARATUS

(75) Inventors: Akira Karasudani, Kawasaki (JP);
Yasuhiko Nakano, Kawasaki (JP);
Yoshiyuki Okada, Kawasaki (JP);
Hideo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 50 days.

(21) Appl. No.: 10/144,359

(22) Filed: May 14, 2002

(65) Prior Publication Data

US 2002/159760 A1 Oct. 31, 2002

Related U.S. Application Data

(63) Continuation of application No. PCT/JP99/06444, filed on Nov. 18, 1999.

(51) Int. Cl.⁷ .............................. H04N 7/00; H04N 7/26
(52) U.S. Cl. ......................................... 386/46; 386/111
(58) Field of Search .............................. 386/1, 46, 94, 386/95, 111; 360/60; 380/201, 203

(56) References Cited

U.S. PATENT DOCUMENTS 6,115,537 A  *  9/2000  Yamada et al. ............. 386/109
6,167,186 A     12/2000  Kawasaki et al.
6,330,394 B1 * 12/2001  Itoi ............................ 386/113
6,411,770 B1 *  6/2002  Ito et al. ...................... 386/46

FOREIGN PATENT DOCUMENTS

| JP | HEI 7-303238 | 11/1995 | ............ H04N/5/92 |
| JP | HEI 9-139915 | 5/1997 | ............ H04N/5/92 |
| JP | HEI 10-13773 | 1/1998 | ............ H04N/5/76 |
| JP | HEI 10-66061 | 3/1998 | ............ H04N/7/18 |
| JP | HEI 10-145734 | 5/1998 | .......... H04N/5/915 |

* cited by examiner

Primary Examiner—Thai Tran
Assistant Examiner—Polin Chieu
(74) Attorney, Agent, or Firm—Staas & Halsey LLP

(57) ABSTRACT

An apparatus for recording digital video images in an endless fashion. The apparatus includes (a) a video data recording mechanism, (b) a mark setting mechanism, (c) a mark management mechanism, (d) a mark erasure mechanism, and (e) a playback allowing area setting mechanism. Upon playback of endlessly recorded video images, seamless video playback can be achieved without suffering from a disorder of video images caused by playback of destroyed video data.

24 Claims, 28 Drawing Sheets

FIG. 4

DATABASE FOR MARKS 116

| VIDEO DATA | POSITION OF MARK | SIZE OF GOP | POSITION OF CORRESPONDING AAU | RECORDING TIME | PRIORITY | RECORDING TERM |
|---|---|---|---|---|---|---|
| VIDEO 2 | ◀9 | 200KB | ×××  | 14:30 | 1 | 2 HOURS |
| VIDEO 1 | ◀4 | 200KB | ××× | 12:00 | 2 | 3 HOURS |
| VIDEO 1 | ◀5 | 170KB | ××× | 12:10 | 2 | 3 HOURS |
| VIDEO 1 | ◀6 | 160KB | ××× | 12:20 | 2 | 3 HOURS |
| VIDEO 2 | ◀7 | 200KB | ××× | 14:10 | 1 | 2 HOURS |
| VIDEO 2 | ◀8 | 190KB | ××× | 14:20 | 1 | 2 HOURS |

FIG. 26

DATABASE FOR MARKS 316

| VIDEO DATA | FILE NUMBER TO WHICH VIDEO DATA BELONGS | POSITION OF MARK | POSITION OF CORRESPONDING AAU | RECORDING TIME | PRIORITY |
|---|---|---|---|---|---|
| VIDEO 2 | 322 | ◀9 | x x x | 14:30 | 2 |
| VIDEO 1 | 322 | ◀10 | x x x | 12:00 | 2 |
| VIDEO 1 | 322 | ◀11 | x x x | 12:10 | 2 |
| VIDEO 1 | 323 | ◀12 | x x x | 12:20 | 3 |
| VIDEO 2 | 323 | ◀13 | x x x | 14:10 | 3 |
| VIDEO 2 | 323 | ◀14 | x x x | 14:20 | 3 |
| VIDEO 2 | 323 | ◀15 | x x x | 14:20 | 3 |

ENDLESS VIDEO RECORDING APPARATUS

This application is a continuation of application No. PCT/JP99/06444 filed Nov. 18, 1999.

TECHNICAL FIELD

This invention relates to an apparatus for recording digital video images in an endless fashion, and more particularly to an endless video recording apparatus suitable for use to endlessly record digital video images coded using the MPEG which is an international standard of the moving picture coding system.

BACKGROUND ART

Endless recording is known as one of recording methods of video images. The endless recording is a technique of overwriting, after video images are recorded fully into an area on a recording medium which allows recording, new video images on the video data recorded formerly beginning with the top of the recording area again to continuously record an object (video images) incessantly without stopping the recording. Conventionally, in order to realize endless recording of video images (moving pictures), a method is employed wherein analog video images are recorded onto a sequential medium such as a VTR (Video Tape Recorder) or a DV (Digital Video).

However, the sequential medium requires rewinding at a point of time when it is recorded up to the last end, and therefore, it cannot be recorded during the rewinding. Further, since the sequential medium cannot be played back while it is being recorded, in order to play back the sequential medium, recording of the sequential medium must be stopped. Furthermore, since the degree of freedom in accessing of the sequential medium is limited to a one-dimensional one, there is a limitation to the range of applications which can be realized.

Therefore, in recent years, attention is attracted to random access media represented by a magnetic disk or a magneto-optical disk in place of sequential media. A random access medium does not require such rewinding as in the case of sequential media and allows incessant recording. Also it is possible to play back the random access medium while it is being recorded, and besides, the random access medium allows free accessing to any area thereon without any restriction. Due to the characteristics described, where endless recording is executed with a random access medium, not only applications to a monitoring system and so forth which are conventionally used applications but also various applications such as recording and playback of digital video images of general broadcasts can be realized.

Incidentally, thanks to the progress of the coding techniques such as the MPEG-1 and the MPEG-2, digitization of video images and audio sound has advanced rapidly. While the digitization makes it possible to provide a very large amount of information simply and less expensively, simultaneously it is significant in what manner such a very large amount of information should be handled. The endless recording is one of methods for handling such a very large amount of information, and it is considered that the endless recording according to digital video images prevails over conventional analog video images in future.

The endless recording according to digital video images, however, has such subjects to be solved as described below.

Even if analog video images are overwritten on video images recorded in the past by endless recording, since video images in the portion following the overwritten portion remain recorded as they are, video images can be played back in a seamless fashion beginning with any portion of the recording medium. However, digital video images cannot be recorded or played back in a seamless fashion only if they are merely overwritten simply. This is because, although digital video images obtained using a compression technique of the MPEG or the like essentially require information for decoding the video images, there is the possibility that the information may be lost by the overwriting.

In particular, video images are coded and recorded for each predetermined frame unit as shown in FIG. 28, and upon such recording, information (header information) for decoding a video image is recorded at the top portion of each coding unit. Taking the MPEG as an example, a GOP (Group of Pictures) which is a coding unit of the MPEG is formed from data of 15 pictures. However, all of the video data do not each form a picture, but only the top data (I data) form one complete picture while each of the following data (P data and B data) represents a difference from the I data. While the MPEG makes it possible to reduce the total amount of information by recording differences from top data in this manner, if the top I data are lost by overwriting by endless recording, then the remaining data (P data and B data) cannot be decoded any more, and upon playback, the played back image is disordered at the portion.

Compression coding systems for digital video images are classified into those wherein the size of a coding unit upon compression is fixed like the compression coding system for the DV and those wherein the size after compression varies for each coding unit depending upon contents of video images to be compressed like the MPEG, and the subject described above is significant particularly in the latter case. In the former case, since the size of a coding unit is fixed, if a recording area is set in accordance with the size of a coding unit, then video images of a coding unit can be overwritten such that they do not span two coding units recorded formerly. However, in video images wherein the magnitude varies for each coding unit as in the MPEG, a coding unit thereof sometimes spans two coding units recorded formerly. In this instance, the header information of a coding unit recorded formerly is lost by overwriting.

The present invention has been made in view of such subjects as described above, and it is a first object of the present invention to provide an endless video recording apparatus which can seamlessly play back digital video images recorded in an endless fashion.

Further, in the conventional endless recording, a fixed area is determined and endless recording is executed within the range of the fixed area. However, since both of the magnetic disk and the magneto-optical disk have a limitation in the recording capacity of the medium, although data which should be recorded preferentially to data which should be recorded endlessly are present, it is sometimes impossible to record the data because the capacity which can be used for recording other than endless recording is small. Also it sometimes occurs conversely that the other area than the endless recording area remains blank without being used. Accordingly, from the point of view of effective utilization of a recording area limited in this manner, preferably the recording range to which endless recording is applied is varied in accordance with the situation.

Therefore, it is a second object of the present invention to provide an endless video recording apparatus which can perform endless recording while varying the recording range for endless recording in accordance with the situation to efficiently utilize the recording area.

Further, in the conventional endless recording, the order in which data are erased by overwriting when endless recording is performed relies upon the time. Therefore, video images which the user principally wants to enjoy are sometimes erased or recorded by endless recording independently of the will of the user.

Therefore, it is a third object of the present invention to provide an endless video recording apparatus which can preferentially leave those data which the user principally wants to enjoy when endless recording is performed.

DISCLOSURE OF THE INVENTION

In order to attain the first object described above, an endless video recording apparatus of an aspect of the present invention is characterized in that it comprises video data recording means for recording video data coded in accordance with the MPEG system for each particular unit formed from at least one or more GOPs (Groups of Pictures) into an endless recording area secured in a recording medium and recording, where video data are recorded fully in the endless recording area, new video data in an overwriting relationship on the video data recorded formerly in the endless recording area, mark setting means for setting marks to the particular units, mark management means for recording the positions of the marks, the sizes of the particular units corresponding to the marks and the positions of AAUs (Audio Access Units) corresponding to the GOPs, which form the particular units, in a coordinated relationship with the marks into a database, mark erasure means for erasing a mark corresponding to an old particular unit which overlaps with an area into which a new particular unit should be recorded from the database, and playback allowing area setting means for referring to the database to set a playback allowing area, and that, when a mark is erased by the mark erasure means, the video data recording means rewrites an AAU corresponding to the erased mark into a padding stream based on the relationship between the marks and the AAUs recorded in the database and records the padding stream.

With the endless video recording apparatus, even if video data recorded formerly are destroyed by overwriting of new video data, the playback allowing area can be set except the area of the destroyed video data by referring to the database. Consequently, there is an advantage that seamless video playback can be achieved without suffering from a disorder of video images caused by playback of the destroyed video data. Further, the playback allowing area varies together with the database and is updated every time a mark is set/erased. Consequently, there is another advantage that seamless video playback can always be achieved even when playback is performed while endless recording is proceeding. Furthermore, there is an advantage that outputting of data only of audio sound free from a video image which arises from a remaining AAU corresponding to a GOP erased by overwriting can be prevented.

Preferably, the mark erasure means sets a predetermined range with respect to the position of one of the set marks as an overwrite allowing area and erases a mark or marks included in the set overwrite allowing area from within the database. In this instance, the playback allowing area can be set based only on the position of the set mark. Consequently, there is an advantage that it is possible to set a playback allowing area before the size of a particular unit is specified.

The mark erasure means may specify an area into which the new particular unit is to be recorded based on the positions of the marks and the size of the new particular unit and erase a mark or marks included in the specified area from within the database. In this instance, there is an advantage that a playback allowing area can be set with a higher degree of accuracy, and this is effective where the dispersion in size among the particular units is great.

Preferably, the playback allowing area setting means sets an area from the mark whose recording time is oldest to the last end of a particular unit corresponding to the mark whose recording time is newest as the play back allowing area. By this configuration, there is an advantage that the range over which playback is possible while endless recording is proceeding can be set to the maximum.

Further, in order to attain the first object described above, an endless video recording apparatus of another aspect of the present invention is characterized in that it comprises video decomposition means for decomposing video data coded in accordance with the MPEG system for each particular unit formed from at least one or more GOPs, video data recording means for embedding the decomposed video data into recording units of a particular size and recording the recording units into an endless recording area secured in a recording medium and for recording, where the recording units are recorded fully in the endless recording area, a new recording unit in an overwriting relationship on one of the recording units recorded formerly in the endless recording area, and a database in which a relationship between GOPs recorded in the recording units and AAUs corresponding to the GOPs is recorded, and that, when a GOP recorded in an old recording unit is erased by overwriting recording on a recording unit in which new video data are embedded, the video data recording means rewrites an AAU corresponding to the erased GOP into a padding stream based on the relationship between the GOPs and the AAUs recorded in the database and records the padding stream.

With the endless video recording apparatus, even where there is a dispersion in size of the particular unit of video data, since old video data recorded formerly are erased completely by overwriting of new recording units by successively recording video data for each recording unit of a predetermined size, no part of the video data recorded formerly remains at all. Accordingly, there is an advantage that seamless video playback can be achieved without suffering from occurrence of a disorder of video images by playback of destroyed video data. Further, since the video data recorded formerly are erased completely, there is an advantage also that a playback allowing area in the endless recording area need not be searched for every time playback is started. Furthermore, there is an advantage that outputting of data only of audio sound free from a video image which arises from a remaining AAU corresponding to a GOP erased by overwriting can be prevented.

Preferably, the video data recording means embeds a padding stream into a free area in each of the recording units in which the decomposed video data are embedded and records the resulting recording units. By this configuration, there is no necessity to remove an invalid data portion in a recording unit upon playback any more, and there is an advantage that video data can be decoded and played back while keeping its matching property as a data stream of the MPEG.

Preferably, the endless video recording apparatus comprises mark setting means for setting a mark for each of the particular units, mark management means for coordinating the relationship between the GOPs and the AAUs corresponding to the GOPs with the marks and recording the positions of the marks in the endless recording area into the database, and mark erasure means for erasing a mark corresponding to old video data which are to be erased by overwriting recording of a recording unit in which new video data are embedded from within the database. By this configuration, there is an advantage that the use of a mark makes it possible to readily search for the position of a recording unit in the endless recording area.

Furthermore, in order to attain the first object described above, an endless video recording apparatus of a further aspect of the present invention is characterized in that it comprises file preparation means for preparing a plurality of files in an endless recording area secured in a recording medium, video data recording means for successively recording video data coded in accordance with the MPEG system in a particular unit formed from at least more than one GOP for each of the files, and a database in which a relationship between the GOPs recorded in the files and AAUs corresponding to the GOPs is recorded, that, when video data are recorded fully into the recording areas of all of the files, the file preparation means deletes one of the plurality of files and prepares a new file, and that, when one of the files is deleted, the video data recording means rewrites an AAU corresponding to a GOP erased upon the deletion of the file into a padding stream based on the relationship between the GOPs and the AAUs recorded in the database and records the padding stream.

With the endless video recording apparatus, even where there is a dispersion in size of the particular unit of video data, since old video data recorded formerly are erased completely by deletion of a file, no part of the video data recorded formerly remains at all. Accordingly, there is an advantage that seamless video playback can be achieved without suffering from occurrence of a disorder of video images by playback of destroyed video data. Further, there is an advantage also that endless recording can be continued without performing control in a unit of a mark or control in a recording unit. Furthermore, where the video data are recorded in a unit of at least more than one GOP into the files, there is an advantage that it can be prevented that one GOP is recorded divisionally into two files. In addition, there is an advantage that outputting of data only of audio sound free from a video image which arises from a remaining AAU corresponding to a GOP erased by overwriting can be prevented.

Preferably, the endless video recording apparatus comprises mark setting means for setting a mark to the video data to be recorded for each particular unit, and mark management means for recording the positions of the marks in the endless recording area into the database. According to configuration, there is an advantage that the use of a mark makes it possible to readily search for the position of a particular unit on the endless recording area.

Further, in the aspects of the present invention described above, preferably a database recording area is secured in the recording medium, and the mark management means records the database at predetermined intervals of time into the database recording area. If the database is recorded onto the recording medium every time it is updated, then processing other than recording of video data is required, and this gives rise to deterioration of the performance of the system. However, by recording the database at the predetermined intervals of time in this manner, there is an advantage that the latest information can be stored onto the recording medium while suppressing deterioration of the system.

A database recording area may be secured in the recording medium, and the mark management means may record the database once into temporary recording means and record the database into the database recording area when the database is updated by a predetermined number of times in the temporary recording means. In this instance, since accessing to the recording medium does not occur when the database is not updated, there is an advantage that deterioration of the system can be further suppressed.

Furthermore, a database recording area maybe secured in the recording medium, and the mark management means may record, during endless recording, the database into temporary recording means and record the database into the database recording area at a point of time when the endless recording is completed. In this instance, although information remains not stored until endless recording comes to an end, since accessing other than recording of video data does not occur during recording of video data, there is an advantage that deterioration of the performance of the system can be prevented.

Further, in the aspects of the present invention described above, preferably the endless video recording apparatus comprises video playback means for searching for a playback starting point in a unit of a mark from within the database and reading out video data of a particular unit corresponding to the searched out mark from the endless recording area to start playback of the video data. When playback is performed while endless recording is proceeding, while it is necessary to set from what location the playback should be started, by searching using a mark in this manner, there is an advantage that the playback starting location can be set readily and quickly.

Meanwhile, in order to attain the second object described above, in the aspects of the present invention described above, the endless video recording apparatus comprises endless recording area setting means for dynamically and adjustably setting the endless recording area in accordance with increase or decrease of the free area in the recording medium. According to this configuration, there is an advantage that the recording area in the recording medium can be utilized efficiently.

In this instance, preferably, when a releasing request is received from another application, the endless recording area setting means releases the endless recording area in accordance with the releasing request. According to this configuration, there is an advantage that endless recording can be continued without disturbing execution of an important application.

The endless video recording apparatus may comprise endless recording area setting means for setting a predetermined area in the recording medium as the endless recording area preferentially to a request from any other application. In this instance, there is an advantage that an endless recording area can be secured with certainty in the recording medium and endless recording can be performed with certainty irrespective of the situation of execution of another application.

Further preferably, the endless video recording apparatus comprises header recording area setting means for setting a header recording area into which basic information of recorded video images should be recorded in the recording medium separately from the endless recording area. According to this configuration, there is an advantage that basic information necessary for playback of video data can be stored with certainty.

On the other hand, in order to attain the third object described above, in the aspects of the invention described above, the endless video recording apparatus is configured such that it comprises priority setting means for setting, for each of video contents, a priority with which a record of the video contents should be left, that the mark management means records the priorities set by the priority setting means in a corresponding relationship to the marks into the database, and that the video data recording means searches, where video data are recorded fully in the endless recording area, for a mark corresponding to video contents having a low priority from within the database and records new video data in an overwriting relationship on the video data corresponding to the searched out mark. According to the configuration, if the user sets a priority for each of video contents in advance, then the video data are erased beginning with those which have a low priority. Consequently, there is an advantage that endless recording can be performed while data which the user principally wants to enjoy are left preferentially.

In this instance, preferably, where a plurality of video data having an equal priority are recorded, the video data recording means overwrites the new video data on the video data of the equal priority beginning with the video data whose recording time is old. According to this configuration, there is an advantage that a video image which has a higher priority and is newer can be left for a longer period of time.

Further preferably, the mark management means further records recording terms of the recorded video data in a corresponding relationship to the marks into the database, and, where video data are recorded fully in the endless recording area, the video data recording means searches for a mark corresponding to video contents having a low priority among those video data whose recording term has expired from within the database and records the new video data in an overwriting relationship on the video data corresponding to the searched out mark. According to this configuration, there is an advantage that, if the user set the time, within which the video data are, according to the recognition of the user, valuable as information, is set as a recording term, then endless recording can be performed while preferentially leaving those data which are high in degree of freshness of information and high in priority of video contents.

Where a video image is recorded into a file, preferably the endless video recording apparatus is configured such that it comprises priority setting means for setting, for each of video contents, a priority with which a record of the video contents should be left, and file selection means for selecting a file into which the inputted video data should be recorded in accordance with the priority set by the priority setting means, that the video data recording means records the video data into the file selected by the file selection means, and that, when video data are recorded fully in the recording areas of all of the files, the file preparation means deletes a file in which video data having a low priority are recorded and prepares a new file. According to this configuration, if the user sets a priority for each video contents, then the video data are erased beginning with those which have a low priority. Consequently, there is an advantage that endless recording can be performed while data which the user principally wants to enjoy are left preferentially.

BRIEF DESCRIPTION OF THE DRAWINGS

FIG. 4 is a view showing a database for marks of the endless video recording apparatus as the first embodiment of the present invention;

FIG. 26 is a view showing a mark database of the endless video recording apparatus as the fourth embodiment of the present invention;

BEST MODE FOR CARRYING OUT THE INVENTION (a) Description of the First Embodiment FIG. 1 is a block diagram showing a configuration of a digital video editing system to which an endless video recording apparatus as a first embodiment of the present invention is applied.

As shown in FIG. 1, the present digital video editing system is formed from a digital video editing apparatus 1 and an external recording apparatus 2. The digital video editing apparatus 1 is an apparatus which endlessly records video images inputted from the outside into the external recording apparatus 2 and plays back the recorded video images when necessary, and is formed from a CPU 3, a video inputting section 4, a video encoding section 5, a video outputting section 6, a video decoding section 7, a program memory 8, a data memory 9, and an external recording apparatus control section 10. The components 3 to 10 are connected to each other by a bus 11.

Figure 1:
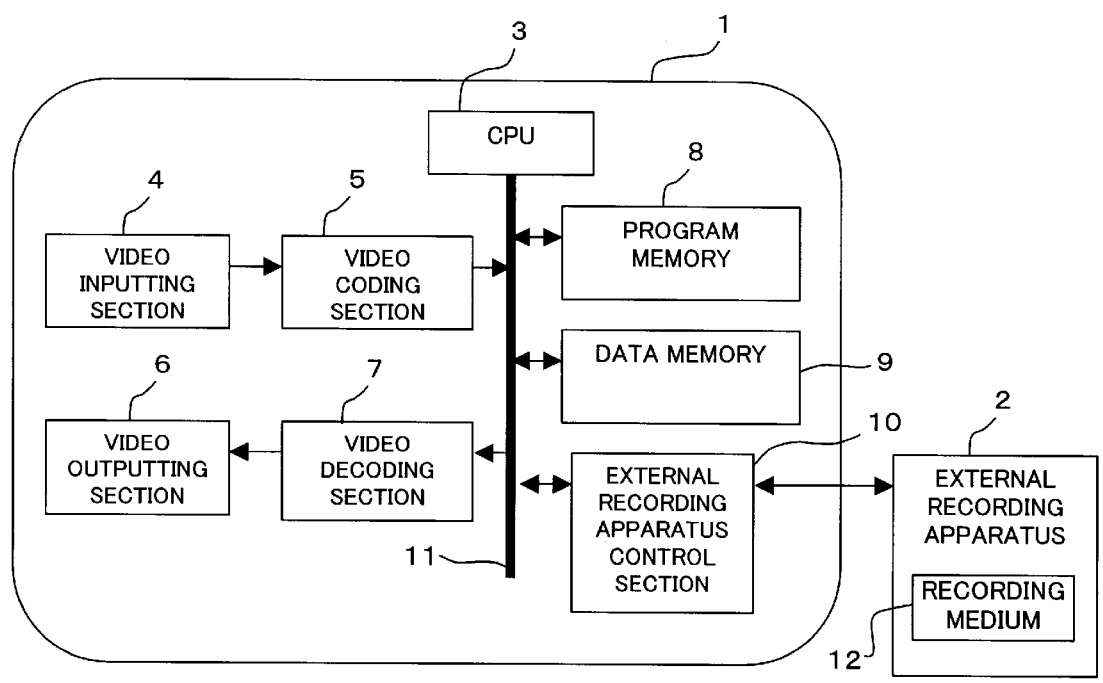
FIG. 1 is a block diagram showing a general configuration of a digital video editing system to which an endless video recording apparatus as a first embodiment of the present invention is applied.

The components 3 to 10 of the digital video editing apparatus 1 are described below. First, the CPU 3 executes various programs and applications stored in the program memory 8 and functions as control means which controls the entire present digital video editing system as hereinafter described.

The video input section 4 is an input interface which receives a digital video signal transmitted from a digital broadcast, a CATV or the like and an analog video signal from an analog broadcast, a VTR or the like, and transmits the received video signal to the video encoding section 5.

The video encoding section 5 is means for converting an analog video signal into a digital video signal, and does not execute processing if an inputted video image is a digital video image, but executes digitization of an input video image if the video image is an analog video image. It is to be noted that, while various known methods can be adopted as an encoding method in the video encoding section 5, it is assumed here that the MPEG method which is an international standard for a moving picture encoding method is adopted. Further, also it is assumed that a digital video signal inputted from the outside is encoded by the MPEG method.

Then, video data digitized by the video encoding section 5 and video data inputted as a digital video signal from the outside are stored once into the data memory 9. The data memory 9 is temporary recording means such as a RAM. Video data stored in the data memory 9 are recorded into the external recording apparatus 2 through the external recording apparatus control section 10 in accordance with an instruction from the CPU 3. Further, also when the video data are to be read out from the external recording apparatus 2, video data read out are temporarily stored. Still further, while not only video data but also various data are temporarily recorded into the data memory 9, this is hereinafter described.

Next, the program memory 8 is recording means into which various programs for causing the present digital editing apparatus to operate are stored. It is possible for the CPU 3 to have various functions by reading out and executing a suitable program from the program memory 8. It is to be noted that functions realized by the CPU 3 using the programs recorded in the program memory 8 are hereinafter described.

The external recording apparatus control section 10 is means which controls the external recording apparatus 2 based on an instruction from the CPU 3, and recording of video data into the external recording apparatus 2 and readout of video data to the external recording apparatus 2 are executed through the external recording apparatus control section 10.

The video decoding section 7 is means which decodes video data to convert them into an analog video signal. Video data read out from the external recording apparatus 2 through the external recording apparatus control section 10 based on an instruction from the CPU 3 are recorded once into the data memory 9 as described above. Then, after necessary processing is performed for the video data in the CPU 3, the video data are sent from the data memory 9 to the video decoding section 7, by which they are decoded into an analog video.

The video outputting section 6 is an output interface for outputting a video image to an external television set or the like. An analog video image decoded in the video decoding section 7 is outputted through the video outputting section 6 and played back on a television set or the like.

The external recording apparatus 2 is described now. A recording medium 12 is provided in the external recording apparatus 2, and video data inputted through the external recording apparatus control section 10 are recorded into a recording area in the recording medium 12. While the recording medium 12 may be a sequential medium such as a digital video tape or a random access medium such as a magnetic disk, a magneto-optical disk or the like if both of recording of video data and readout of recorded video data are allowed, if the degree of freedom in accessing in such a case that playback is performed while recording is proceeding is taken into consideration, then it is favorable to use a random access medium. Here, a random access medium is adopted as the recording medium 12.

While a general configuration of the present digital video editing system is described above, functions obtained by executing the programs and applications recorded in the program memory 8 described above by CPU 3 are described below with reference to a functional block diagram of FIG. 2.

Figure 2:
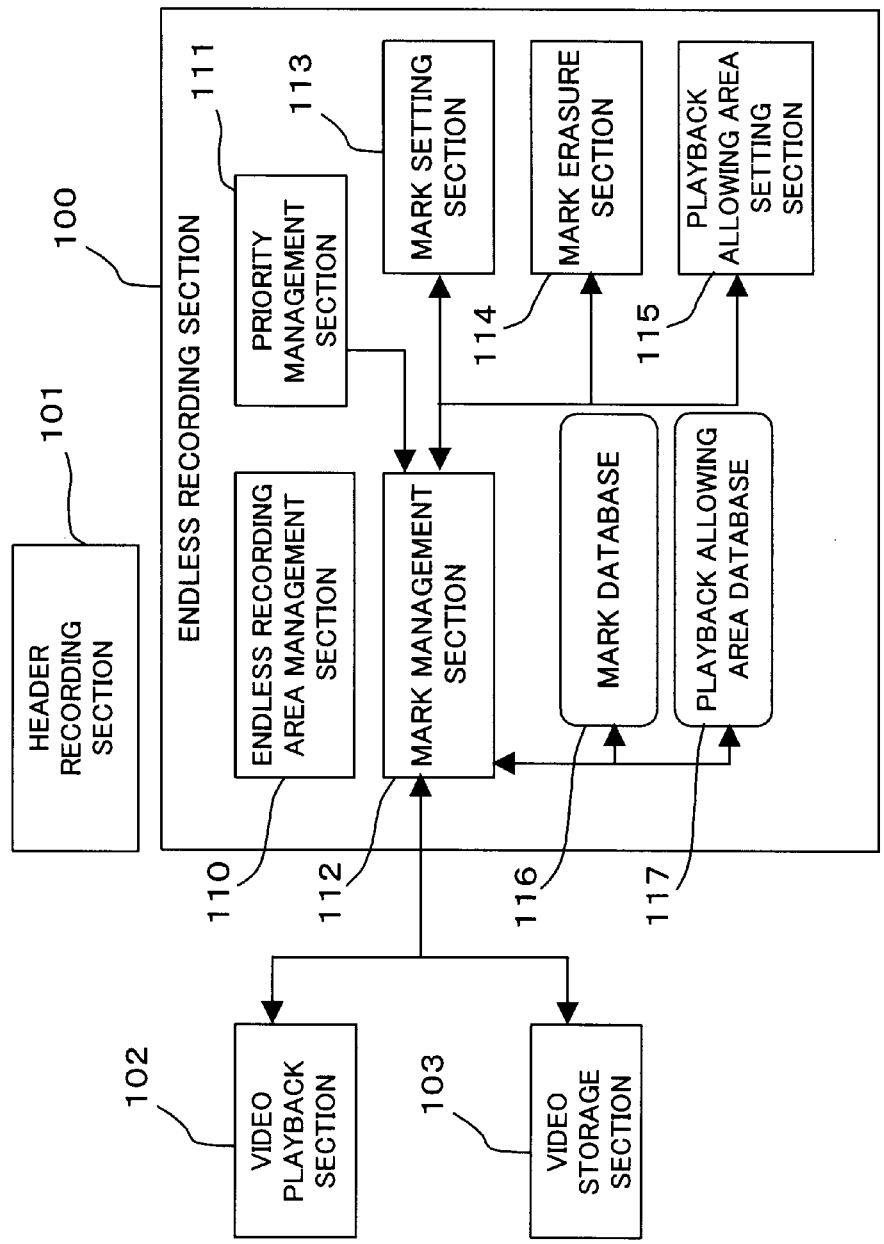
FIG. 2 is a functional block diagram of the endless video recording apparatus as the first embodiment of the present invention.

As shown in FIG. 2, in the present embodiment, the CPU 3 functions as an endless recording section (video data recording means) 100, a header recording section (header recording area setting means) 101, a video playback section (video image playback means) 102, and a video storage section 103 by executing the programs and applications recorded in the program memory 8.

In the present digital video editing system, while endless recording of video data is possible, the endless recording is achieved by cooperation of the endless recording section 100 which is one of the functioning elements described above with an endless recording area management section (endless recording area setting means) 110, a priority management section (priority setting means) 111, a mark management section (mark management means) 112, a mark setting section (mark setting means) 113, a mark erasure section (mark erasure means) 114, a playback allowing area setting section (playback allowing area setting means) 115, a database (mark database) 116, and another database (playback allowing area database) 117 which are functioning elements of the endless recording section 100.

When endless recording is performed, an endless recording area utilized for endless recording is first set from within the recording area in the recording medium 12 by the endless recording area management section 110. The endless recording area management section 110 has two setting modes necessary for setting the endless recording area, and the user can select either one of the setting modes.

First, the first setting mode is a mode for fixing and determining an endless recording area to be used for endless recording from within the recording area in the recording medium 12, and secures an endless recording area preferentially to a request from any other application. Accordingly, in this setting mode, endless recording is normally executed within a fixed area.

The second setting mode is a mode for dynamically varying the endless recording area to be used for endless recording within the recording area in the recording medium 12 at all times, and the endless recording area is adjusted in accordance with increase or decrease of the free area in the recording medium 12. Further, in this setting mode, if a releasing request from another application is received, then the endless recording area is released in accordance with the releasing request. Accordingly, in this setting mode, endless recording is executed in a useable maximum area in the recording medium 12 at any point of time.

It is to be noted that selections between the setting modes described above is performed through selection means not shown.

In the endless recording section 100, endless recording is executed within the endless recording area set in such a manner as described above. In particular, video data are recorded in order beginning with the top address of the set endless recording area, and if video data are recorded fully into the endless recording area, then new video data are recorded in an overwriting relationship on the video data recorded formerly beginning the top of the endless recording area again, thereby to realize endless recording.

Figure 3:
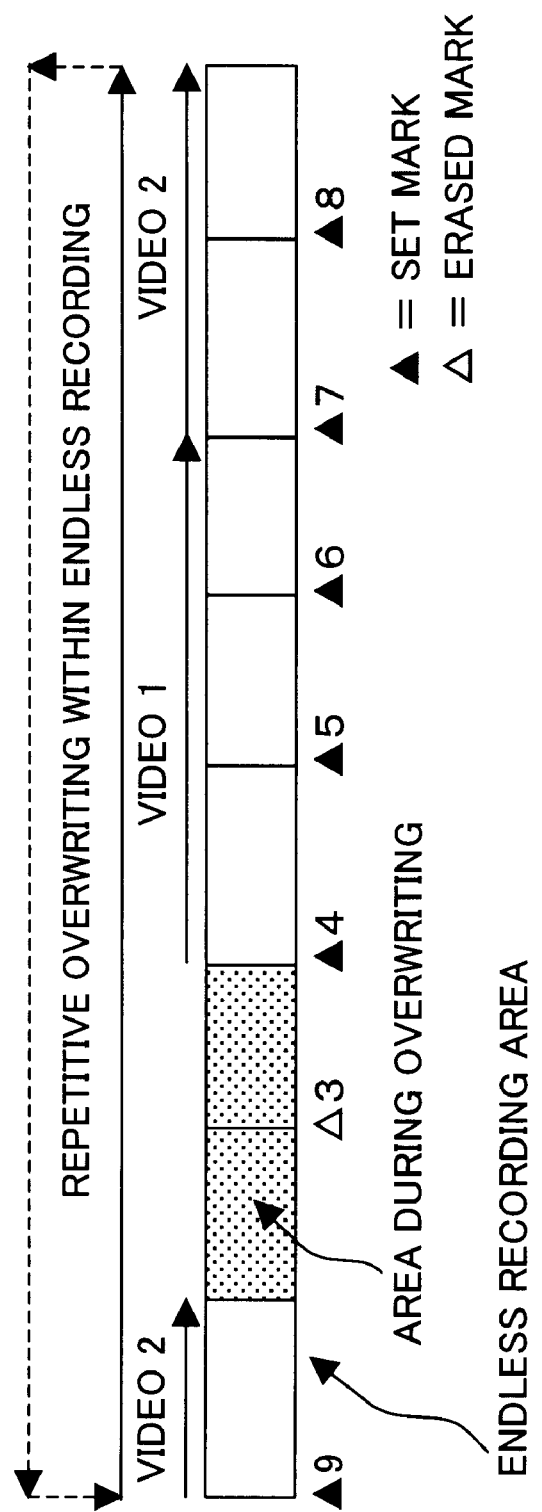
FIG. 3 is a view illustrating a mark setting method by the endless video recording apparatus as the first embodiment of the present invention.

At this time, in the endless recording section 100, when video data are to be recorded into the endless recording area, a mark is set for each of predetermined encoding units by the mark setting section 113. In particular, for example, in the MPEG method, while one GOP is formed from data of fifteen video pictures, a mark is set to the top position of this GOP as seen in FIG. 3 by the mark setting section 113.

Such set marks are managed by the mark management section 112. The mark management section 112 prepares such a database (mark database) 116 as shown in FIG. 4 and manages the marks using the database 116. In the database 116, the size of a GOP corresponding to each mark (for example, in video images of the encoding rate of 1.5 Mbps wherein one GOP is formed from 15 frames, one GOP has a size of approximately 200 KB), a recording time of the GOP, the position of an AAU corresponding to the GOP, contents of recorded video data, a priority of the data and a recording term are recorded in a coordinated relationship with the position of the mark in the endless recording area [(the position is indicated, for example, by the length of video data from the top or a time stamp (SCR) in the video data), and they are placed in the descending order from the top mark in the endless recording area. It is to be noted that the database 116 shown in FIG. 4 corresponds to the endless recording state shown in FIG. 3.

The mark management section 112 additionally writes new data into the database 116 every time a new mark is set. Then, if video data are recorded fully into the endless recording area and recording is started from the top of the endless recording area again, then data corresponding to a newly set mark are recorded beginning with the top of the database 116 again.

When a new GOP is to be recorded on another GOP recorded already in such a manner as described above, the endless recording section 100 first erases a mark corresponding to an old GOP which overlaps with an area into which the new GOP is to be recorded from the database 116 by the mark erasure section 114. In particular, an area into which the new GOP is to be overwritten is assumed as a range of two GOPs including the GOP at which the set mark is positioned, and the area for the two GOPs is designated as an overwrite allowing area. Then, a mark corresponding to any of the GOPs in the designated overwrite allowing area is erased from the database 116 by the mark erasure section 114. It is to be noted that the reason why an area for two GOPs is designated as an overwrite allowing area in this manner is that, since the size of a GOP fluctuates depending upon fluctuation of the encoding amount, a case wherein the overwrite allowing area becomes greater than the GOP to be erased by overwriting is considered.

Then, after the old mark is erased to update the database 116, a new mark is set by the mark setting section 113 while the new video data are successively recorded into the designated overwrite allowing area. Then, the database 116 is updated again at a point of time when the entire GOP corresponding to the set mark is recorded.

Further, at this time, when the video data are overwritten by the endless recording section 100, there is the possibility that audio data (an AAU) corresponding to the video data (the GOP or GOPs) erased by overwriting may remain in the endless recording area. If an AAU remains without being erased in this manner, then data only of audio sound including no video data are outputted upon playback.

Therefore, when the endless recording section 100 overwrites video data (a GOP), that is, when a mark is erased by the mark erasure section 114, it is confirmed whether or not an AAU corresponding to the old GOP to be erased by overwriting remains based on the relationship between the marks and the AAUs corresponding to the marks recorded in the database 116 of the mark management section 112. Then, if such an AAU remains, then the pertaining AAU is replaced with a padding stream (Padding Stream).

Incidentally, as described in the description of the background art, I data which are essentially required for playback of a video image, a timestamp for establishing synchronism upon playback and so forth are recorded at a top portion (header) of a GOP, and if the header is erased by overwriting, then it is impossible to play back a video image even if the other portion remains. Also it is similarly impossible to play back a GOP being recorded.

Therefore, the endless recording section 100 sets, in order to except those areas which cannot be played back from the playback area, a playback allowing area in the endless recording area every time the database 116 is updated by the playback allowing area setting section 115. In particular, since a mark is set or erased in an area during recording and an area in which a GOP whose header part at the top is erased is recorded and it can be discriminated whether or not the area can be played back depending upon whether or not a mark is present, the playback allowing area setting section 115 sets a portion from a mark whose recording time is oldest to the last end of a GOP which corresponds to the newest mark as a playback allowing area.

Figure 5:
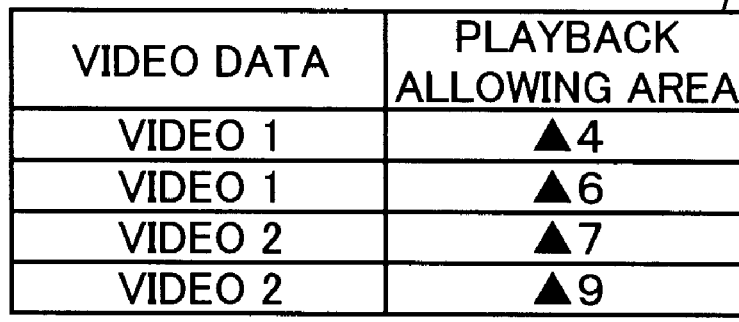
FIG. 5 is a view showing a database for playback allowing areas of the endless video recording apparatus as the first embodiment of the present invention.

Then, the playback allowing area setting section 115 performs updating setting of the playback allowing area in accordance with updating of the database 116 for marks by end less recording. The set playback allowing area is represented as a mark (upper stage) of a start point and a mark (lower stage) of an end point for each of video contents as shown in FIG. 5 and recorded into the database (playback allowing area database) 117 by the mark management section 112. It is to be noted that the database 117 shown in FIG. 5 corresponds to the database 116 shown in FIG. 4.

The mark management section 112 prepares the databases 116 and 117 described above on the data memory 9 and updates the databases 116 and 117 every time a mark is set/erased. Further, the mark management section 112 secures a database recording area in the recording medium 12, and records the databases 116 and 117 temporarily recorded on the data memory 9 at predetermined time intervals into this database recording area by overwriting.

It is to be noted that the time interval after which the mark management section 112 overwrites the databases 116 and 117 into the database recording area can be set arbitrarily, and also it is possible to set such setting that the databases 116 and 117 are recorded into the data memory 9 during endless recording and then recorded into the database recording area at the point of time when the endless recording is ended. Further, it is also possible to set such that, if the databases 116 and 117 are updated by a predetermined number of times on the data memory 9, then they are recorded into the database recording area.

The priority management section 111 is means for causing, when the endless recording area is filled with video data and it becomes necessary to overwrite video data on video data recorded formerly, the video data to be overwritten on the formerly recorded video data in order beginning with those video data whose priority is low. This priority is set in accordance with video contents such a classification as, for example, a drama or news, or more particularly such a classification as a drama at nine o'clock or news at eleven o'clock, and the user determines in advance a priority for each of video contents. The priority management section 111 classifies video data based on information of an EPG (Electric Program Guide) every time a mark is set by the mark setting section 113, and sets a priority determined in advance for each of the video data and automatically records them into the database 116.

Some video data may be low in value because the information is old although the priority of the video contents is high. Therefore, the priority management section 111 can manage not only the priority for each of the video contents but also the recording term for each of the video contents. If the user determines a recording term for each of the video contents, then the priority management section 111 automatically records the priority and the recording term corresponding to the GOP into the database 116.

Then, the endless recording section 100 refers, when the video data are to be overwritten, to the database 116 to examine the priority and the recording term for each of the video data, and determines a set of video data whose priority is lowest among those video data whose recording term has expired and overwrites the video data on the determined video data in order beginning with the oldest video data in the set. Further, if those video data whose recording term has expired do not exist, then the endless recording section 100 overwrites the video data on the video data in order beginning with the oldest video data in the set of those video data whose priority is lowest.

Next, the header recording section 101 is described. The header recording section 101 is means for recording basic information necessary to play back video data encoded by the MPEG method such as a transfer rate of video images being recorded. The header recording section 101 sets a header recording area for recording the basic information separately from the endless recording area in the recording medium 12, and if MPEG data are inputted, then basic information included in the MPEG data is recorded into the set header recording area.

The video storage section 103 is means which serves as an interface between the video encoding section 5 and the recording medium 12 (external recording apparatus 2) upon endless recording. Video data digitized by the video encoding section 5 and video data inputted as a digital video signal from the outside are inputted to the endless recording section 100 and the header recording section 101 through the video storage section 103, and are outputted to and recorded into the recording medium 12 through the video storage section 103 again after processing such as updating of the databases 116 and 117 is executed.

Finally, the video playback section 102 is described. The video playback section 102 is means for playing back video images recorded by endless recording and serves also as an interface between the video decoding section 7 and the recording medium 12. When a video image is to be played back, the video playback section 102 first reads out the basic information necessary to play back the video image from the header recording area, and then examines the playback allowing area recorded in the database 117 through the mark management section 112 and executes playback processing within a designated range, that is, a range from a mark whose recording time is oldest to the last end of a GOP corresponding to the newest mark. It is to be noted that, since the playback allowing area varies every moment, the video playback section 102 examines the playback allowing area every time the playback point is moved.

Further, the video playback section 102 searches for a playback starting location in a unit of a mark from the database 116 and reads out video data corresponding to the searched out mark from the endless recording area to start playback. Further, the video playback section 102 successively performs a search for a mark from the database 116 in the forward direction or the reverse direction to realize fast feeding or rewinding of video images to be played back.

In the following, operation and effects of the endless video recording apparatus (digital video processing system) as the first embodiment of the present invention having the configuration described above are described with reference to FIGS. 6 to 12.

First, operation upon endless recording is described with reference to a flow chart (steps A100 to A200) shown in FIG. 6 and FIGS. 3 and 7 described hereinabove.

Figure 6:
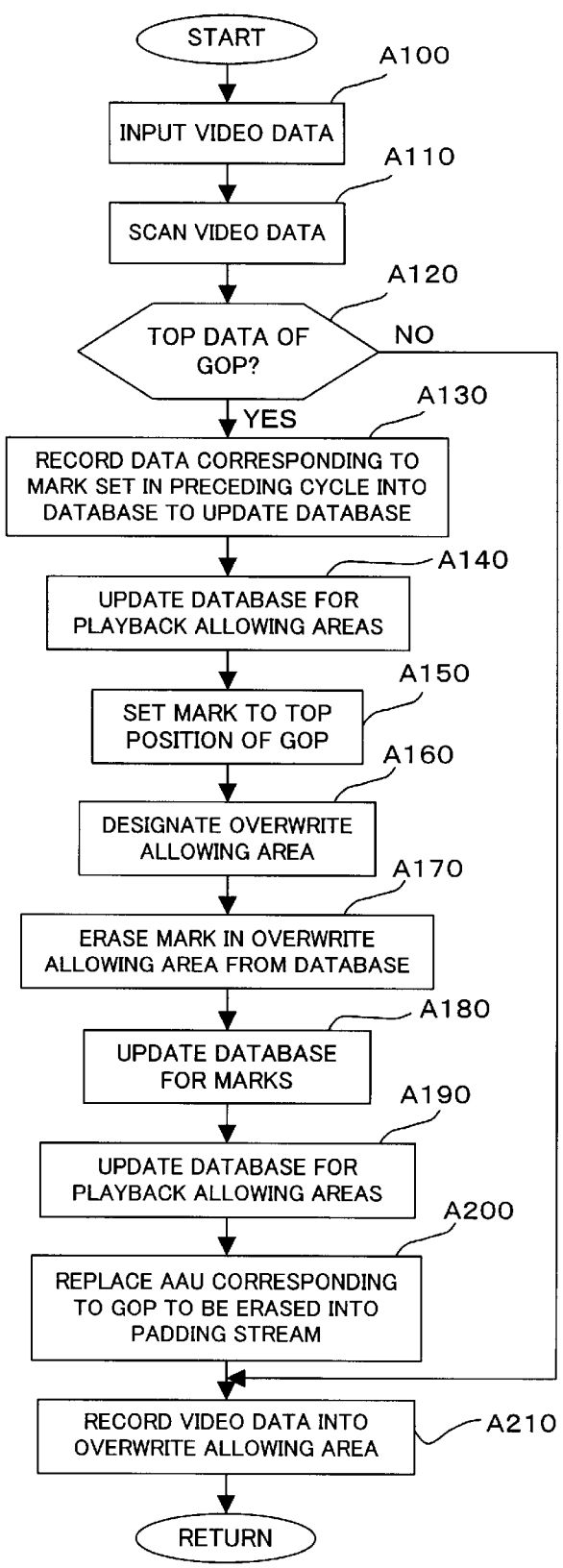
FIG. 6 is a flow chart illustrating operation upon endless recording by the endless video recording apparatus as the first embodiment of the present invention.

Upon endless recording, as seen in FIG. 6, digitized video data are inputted to the endless recording section 100 through the video storage section 103 (step A100). Then, the inputted video data are scanned (step A110), and it is discriminated whether or not a mark should be set to the data, that is, whether not the data are top data of a GOP (step A120). At this time, if the scanned image data are not top data of a GOP (refer to the NO route of step A120), then the processing advances to step A200, at which the video data are recorded into an overwrite allowing area designated in the endless recording area secure in the recording medium 12 (step A210).

On the other hand, if the scanned video data are top data of a GOP (refer to the YES route of step A120), then the position of a mark corresponding to a GOP recorded in the preceding cycle, the size of the GOP, the recording time of the GOP, the position of an AAU corresponding to the GOP, contents of the recorded video data, the priority of the data and the recording term are first recorded into the database 116 to update the database 116 by the mark management section 112 (step A130). Together with the updating of the database 116, also the database 117 is updated based on the position information of the mark and so forth recorded in the database 116 by the playback allowing area setting section 115 (step A140).

Then, a mark is set to the top position of the GOP by the mark setting section 113 (step A150), and it is assumed that the area into which the new GOP should be overwritten is the range of the two GOPs including the GOP in which the set mark is positioned and the area for the two GOPs is designated as an overwrite allowing area (step A160) After the overwrite allowing area is designated, a mark corresponding to any GOP within the area is erased from the database 116 by the mark erasure section 114 (step A170), and the database 116 is updated (step A180) Also the playback allowing area database 117 is updated based on the position information of the marks and so forth recorded in the database 116 by the playback allowing area setting section 115 (step A190).

Further, it is confirmed based on the relationship between the marks and corresponding AAUs recorded in the database 116 whether or not an AAU corresponding to an old GOP to be erased by overwriting remains, and if such an AAU remains, then the pertaining AAU is replaced into a padding stream (step A200).

Then, after the processing described above, the inputted video data are successively recorded into the overwriting allowing area (step A210). It is to be noted that information relating to the entire video image upon endless recording is stored by a process separate from that described above by the header recording section 101.

Figure 7:
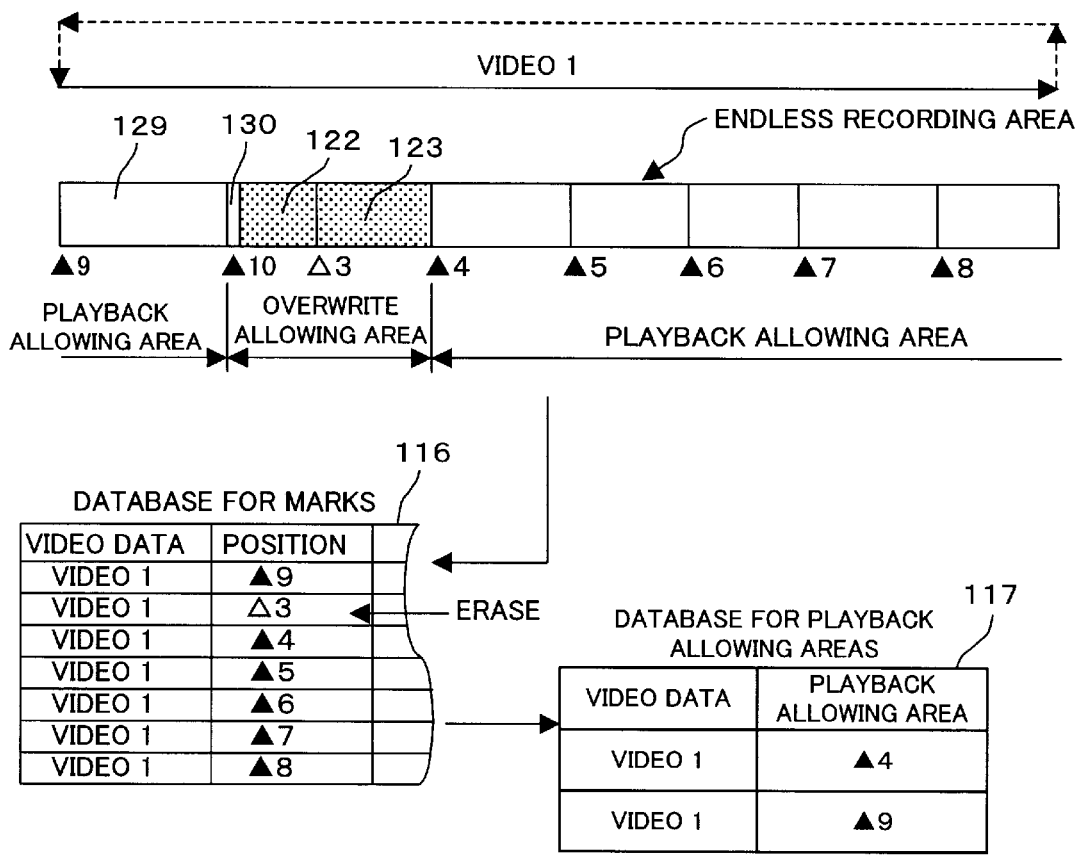
FIG. 7 is a schematic view illustrating operation upon endless recording by the endless video recording apparatus as the first embodiment of the present invention and is a view showing a state at time T;.
Figure 8:
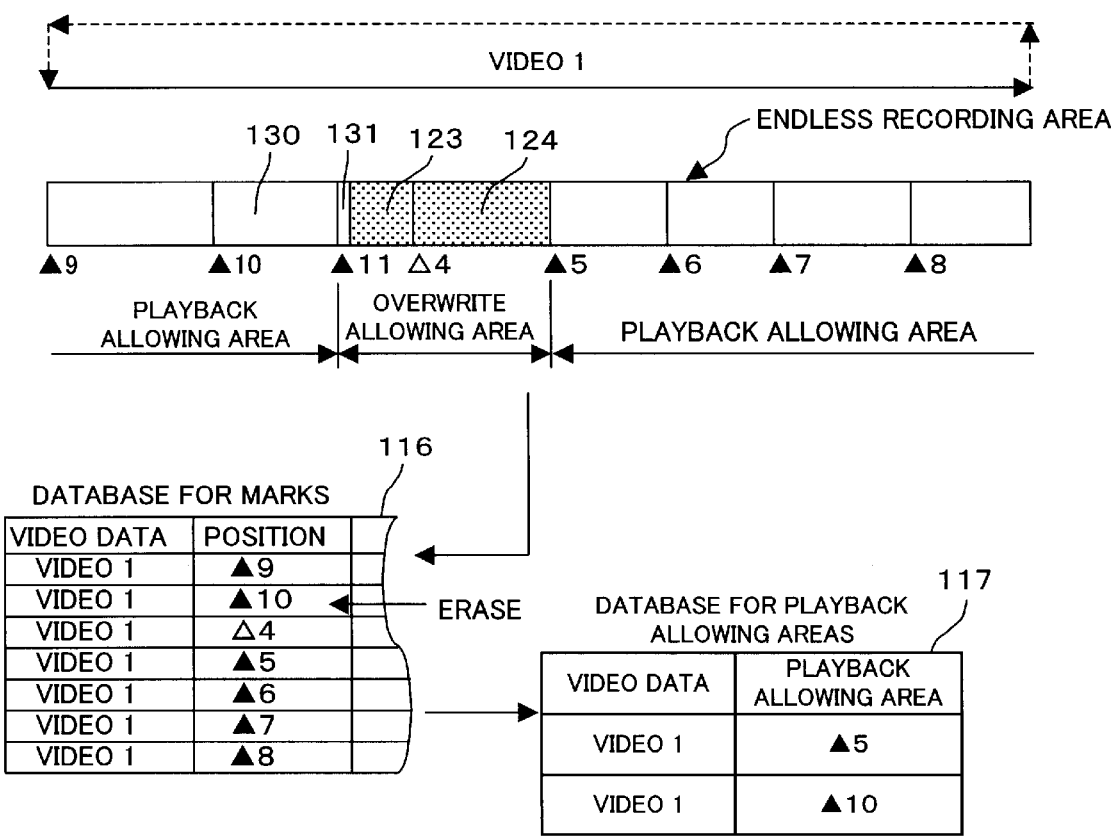
FIG. 8 is a schematic view illustrating operation upon endless recording by the endless video recording apparatus as the first embodiment of the present invention and is a view showing a state at time T+1.

Here, FIGS. 7 and 8 show endless recording states at times T and T+1, respectively. In the following, the processing described above is described more particularly with reference to FIGS. 7 and 8.

First, it is assumed that top data 130 of a new GOP are inputted at time T as seen in FIG. 7. At this point of time, the mark management section 112 records data corresponding to a mark ▲9 set in the preceding cycle into the database 116 to update the database 116 and further updates the database 117 in accordance with the updating of the data base 116. The top data 130 of the GOP are recorded following a GOP 129 recorded in the preceding cycle, and the mark setting section 113 sets a mark ▲10 corresponding to the top data 130 to the trailing end of the GOP 129 recorded in the preceding cycle.

Then, the mark erasure section 114 designates an overwrite allowing area into which the new GOP is to be overwritten to the range of two GOPs of a GOP 122 at which the set mark ▲10 is positioned and a GOP 123 following the GOP 122, and erases any mark included in the area of the range. Here, a mark ▲3 is erased.

After the mark ▲3 is erased by the mark erasure section 114, the mark management section 112 erases all data corresponding to the mark ▲3 from the database 116 to update the database 116. Further, the playback allowing area setting section 115 changes the playback allowing area in accordance with the updating of the database 116. Here, since the mark ▲3 is erased, the playback allowing area is set to the range of the GOPs corresponding to the mark ▲4 to the mark ▲9. The mark management section 112 thus changes the playback start point in the database 117 to the mark ▲4 in response to the change of the playback allowing area to update the database 117.

Subsequently, it is assumed that a new GOP 131 is inputted at time T+1 following the GOP 130 as seen in FIG. 8. At this time, the mark management section 112 records data corresponding to the mark ▲10 into the database 116 to update the database 116 and further updates the database 117 in accordance with the updating of the database 116. The mark setting section 113 sets a mark ▲11 corresponding to the GOP 131 to the trailing end of the GOP 130 recorded in the preceding cycle. Then, the mark erasure section 114 designates the GOP 123 at which the set mark ▲11 is positioned and another GOP 124 following the GOP 123 as the overwrite allowing area, and designates any mark in the area. Here, the mark ▲4 is erased.

After the mark ▲4 is erased by the mark erasure section 114, the mark management section 112 erases all data corresponding to the mark ▲4 from the database 116 to update the database 116. Further, the playback allowing area setting section 115 changes the playback allowing area in response to the updating of the database 116. Here, since the mark ▲10 is set newly and the mark ▲4 is erased, the playback allowing area becomes the range of the GOPs corresponding to a mark ▲5 to the mark ▲10. The mark management section 112 thus changes the playback start point in the database 117 in response to the change of the playback allowing area to the mark ▲5 and changes the end point to the mark ▲10 to update the database 117.

Figure 9:
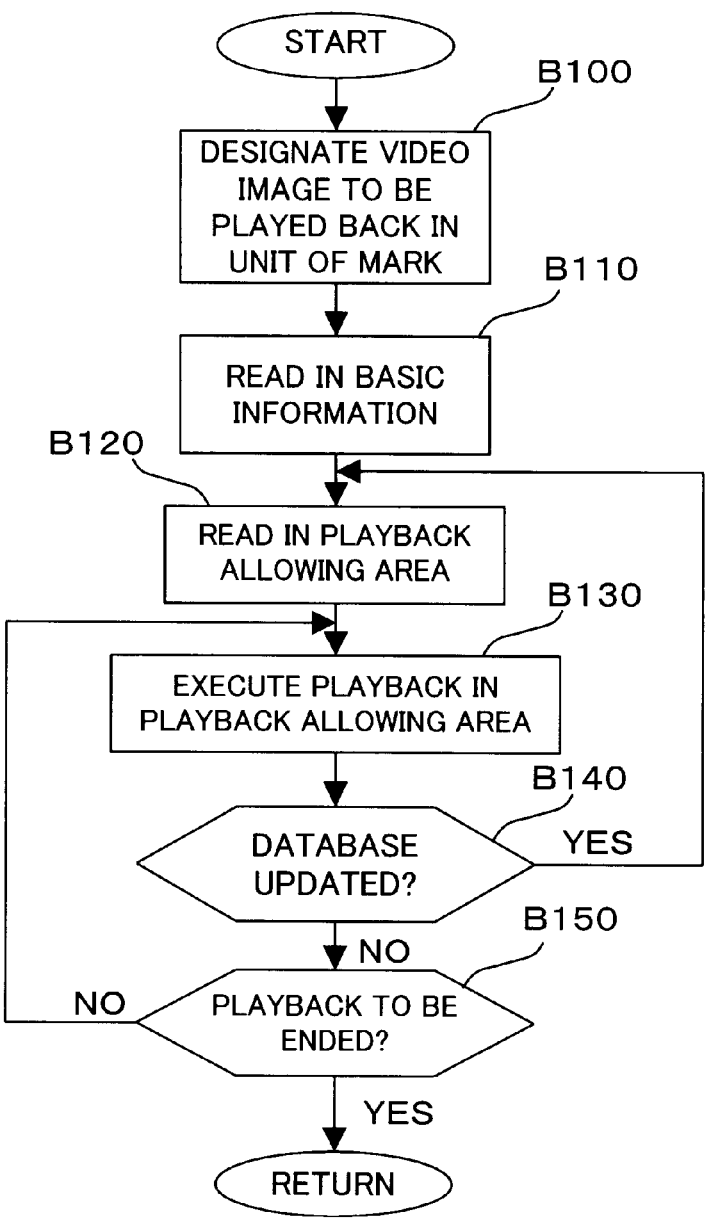
FIG. 9 is a flow chart illustrating operation upon playback by the endless video recording apparatus as the first embodiment of the present invention.

Subsequently, operation upon playback is described with reference to a flow chart (steps B100 to B150) shown in FIG. 9.

In order to play back a video image recorded during endless recording, a video image to be played back is designated in a unit of a mark (step B100), and basic information relating to the video image corresponding to the set mark is read in from the header recording area secure separately from the endless recording area in the recording medium 12 (step B110).

Then, playback allowing area information recorded in the database 117 is read in through the mark management section 112 (step B120), and playback processing is performed within the playback allowing area thus read in. For example, in the case shown in FIG. 7, playback processing is performed within the range from the mark ▲4 to the GOP 129 corresponding to the mark ▲9 (all at step B130).

Then, it is discriminated whether or not the database 117 is updated every time the playback point moves (step B140), and when the database 117 is updated, the processing returns to step B120, at which the updated playback allowing area information is read in so that playback processing is performed within the updated playback allowing area. For example, if the database 117 is updated as seen in FIG. 8, then playback processing is performed within the range from the mark ▲5 to the last end of the GOP 130 corresponding to the mark ▲10.

Then, it is discriminated whether or not a playback ending operation is performed (step B150), and the foregoing processing from step B130 to step B140 is performed repetitively until a playback ending operation is performed.

While operation of the endless video recording apparatus (digital video processing system) as the first embodiment of the present invention upon recording and playback is described in detail above, as can be recognized from the foregoing description, with the present endless video recording apparatus (digital video processing system), even if video data recorded formerly are destroyed by overwriting thereon of new video data, since a playback allowing area can be set except the area of the destroyed video data by referring to the database 116, there is an advantage that seamless video playback is allowed without suffering from a disorder of video images which is caused by playback of the destroyed video data.

Further, since the playback allowing area moves in an interlocking relationship with the database 116 for marks, there is an advantage that, even if playback is performed while endless recording is proceeding, seamless video playback can always be performed.

Further, here, since the range of two GOPs including a GOP at which the set mark is positioned is designated as the overwrite allowing area into which a new GOP is to be overwritten and any mark included in this area is compulsorily erased independently of the size of the GOP to be overwritten newly, there is an advantage that the playback allowing area can be updated quickly only if the position of a mark is specified.

Furthermore, since the range from the mark whose recording time is oldest to the last end of a GOP corresponding to the mark whose recording time is newest is set as the playback allowing area, there is an advantage that the range within which playback can be performed while endless recording is proceeding can be maximized.

Besides, when a mark is erased, an AAU corresponding to the erased mark is rewritten into and recorded as a padding stream based on the relationship between the marks and the AAUs recorded in the database 116. Therefore, there is an advantage also that outputting of data only for audio sound free from video images which arises from the fact that an AAU corresponding to the GOP erased by overwriting remains can be prevented.

Further, if it is assumed that the recording medium is recorded every time the databases 116 and 117 are updated, then processing other than recording of video data becomes required, and this results in deterioration of the performance of the system. However, with the present endless video recording apparatus (digital video processing system), since recording is performed at predetermined intervals of time, there is an advantage that the latest information can be stored into the recording medium while suppressing the deterioration of the system.

Further, with the present endless video recording apparatus (digital video processing system), also it is possible to record the databases 116 and 117 once into the data memory 9 and then record them into the database recording area after they are updated by a predetermined number of times in the data memory 9. In this instance, since no accessing to the recording medium 12 occurs when the databases 116 and 117 are not updated, there is an advantage that deterioration of the system can be further suppressed.

Furthermore, with the present endless video recording apparatus (digital video processing system), also it is possible to record the databases 116 and 117 into the data memory 9 during endless recording and then record them into the database recording area at a point of time when the endless recording comes to an end. In this instance, although data are not stored until the endless recording comes to an end, since no accessing other than recording of video data occurs during recording of video data, there is an advantage that deterioration of the performance of the system can be prevented.

Further, while it is necessary to set, in order to perform playback while endless recording is proceeding, from which location the playback is to be performed, with the present endless video recording apparatus (digital video processing system), there is an advantage that the playback starting location can be set readily and quickly by searching using a mark. Furthermore, there is an advantage also that a fast feeding function and a rewinding function can be realized readily by performing a search for a mark from within the database 116 successively in the forward direction or the reverse direction.

In addition to the advantages described above, the present endless video recording apparatus (digital video processing system) has the following advantages.

In particular, in endless recording, an endless recording area is set to a certain area in the recording medium 12 provided in the external recording apparatus 2, and endless recording is performed repetitively within the area. However, there is the possibility that the external recording apparatus 2 may perform various processes such as recording and editing of video images in addition to the endless recording. At this time, the free area in the recording medium 12 varies depending upon the situation of an application other than the endless recording. For example, if stored video data are erased by an editing operation, then the free area increases, but on the contrary if video images are recorded newly, then the free area decreases.

Figure 10:
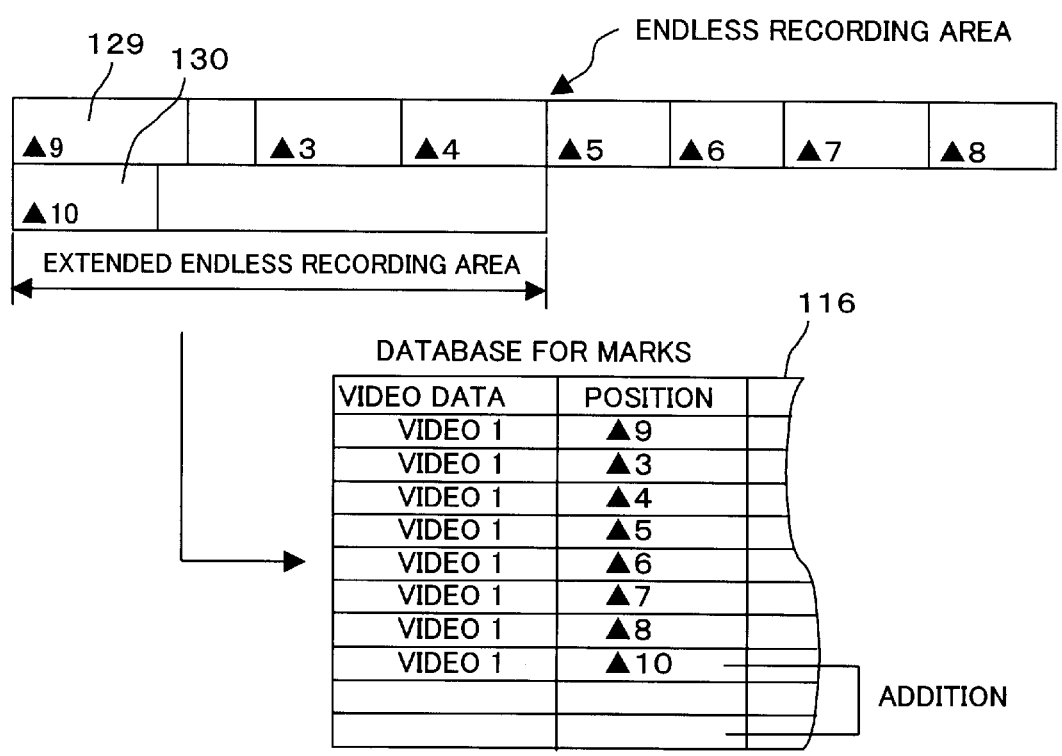
FIG. 10 is a schematic view illustrating extension of an endless recording area by the endless video recording apparatus as the first embodiment of the present invention.
Figure 11:
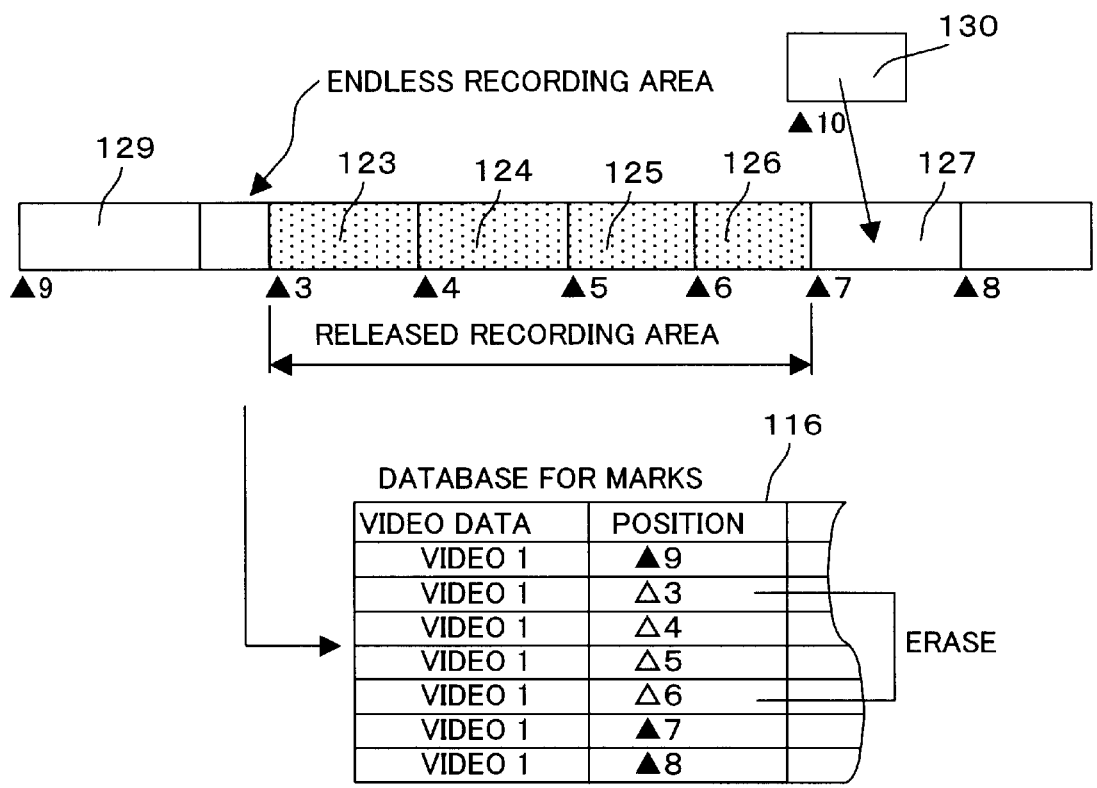
FIG. 11 is a schematic view illustrating reduction of the endless recording area by the endless video recording apparatus as the first embodiment of the present invention.

In the present endless video recording apparatus (digital video processing system), the area for endless recording is dynamically varied in accordance with a variation of the free area. Further, the endless recording area management section 110 normally supervises the area for endless recording and accepts an area releasing request from another application. Then, for example, if the area which can be used for endless recording increases as seen in FIG. 10, then video data (a GOP) to be recorded newly are not overwritten on the old video data, that is, not recorded following the GOP 129 but recorded as a new GOP 130 into the newly extended area, and the extended new area is added to the database 116. On the other hand, if a request to release the endless recording area is received, then old video data are erased in a unit of a GOP as seen in FIG. 11 (here, the GOPs 123 to 126 are erased) to release the recording area, and the inputted video data (GOP 130) are recorded by overwriting on the oldest video data (GOP 127) which remains without being erased and data corresponding to the released area (GOPs 123 to 126) are erased from the database 116.

In this manner, with the present endless video recording apparatus (digital video processing system), since the area for endless recording is dynamically varied in accordance with a variation of the free area, there is an advantage that it becomes possible to efficiently utilize the recording area in the recording medium 12. Further, since the endless recording area is released in response to a releasing request from another application, there is an advantage also that endless recording can be continued without disturbing execution of an important application.

Furthermore, also it is possible to set a predetermined area in the recording medium 12 as the endless recording area preferentially to a request from another application. In this instance, the endless recording area can be secured in the recording medium 12 with certainty, and therefore, there is an advantage that endless recording can be performed with certainty irrespective of an execution situation of another application.

It is to be noted that, since basic information of a recorded video image is recorded into the head recording area set in the recording medium separately from the endless recording area, there is an advantage that basic information necessary for playback of video data can be stored with certainty irrespective of a variation of the endless recording area.

Figure 12:
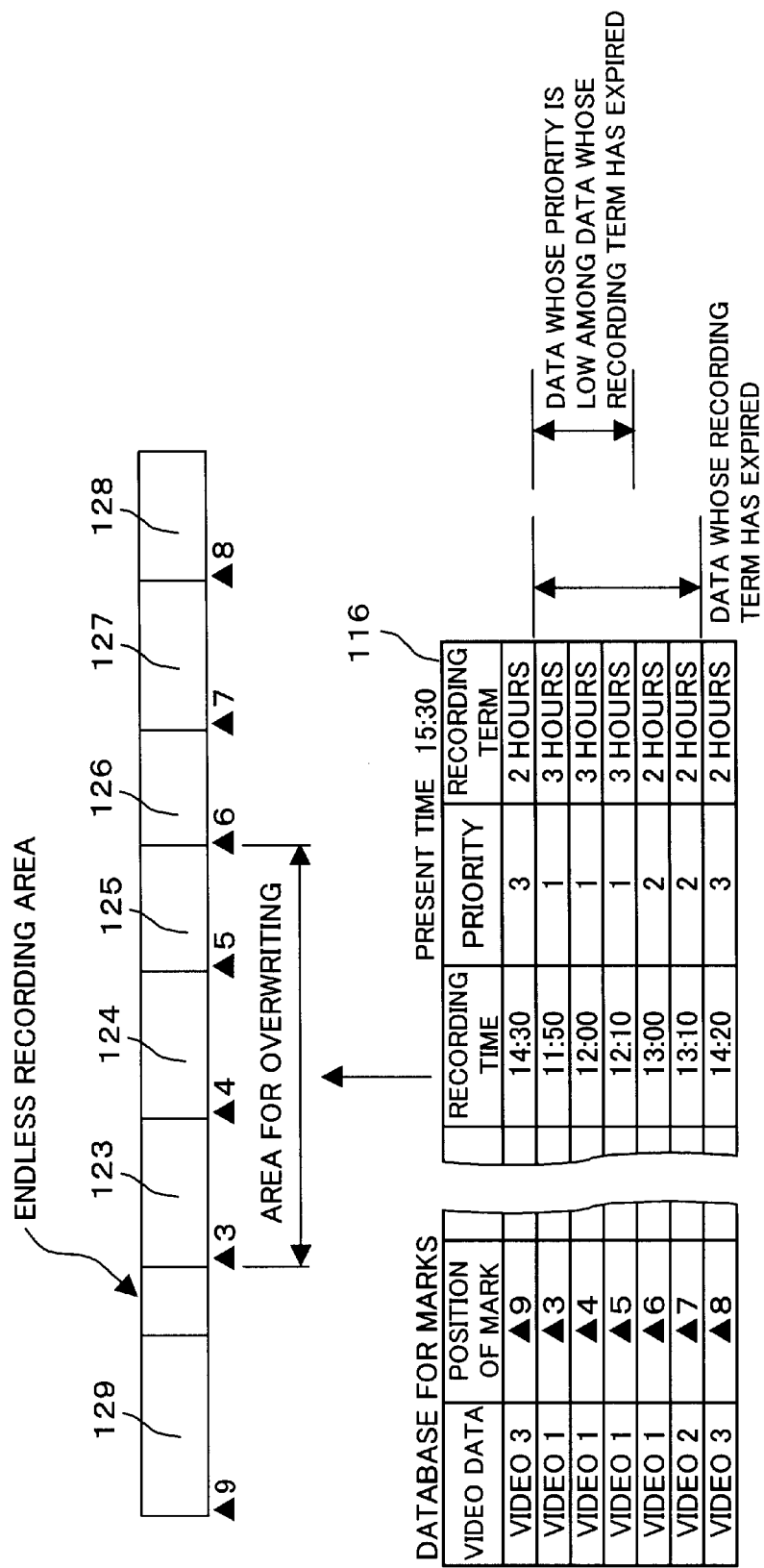
FIG. 12 is a schematic view illustrating a setting method of an overwriting area by the endless video recording apparatus as the first embodiment of the present invention.

Further, with the present endless video recording apparatus (digital video processing system), when video data are recorded, a priority and a recording term in accordance with video contents are recorded into the database 116 for each GOP, and when video data are to be overwritten, the database 116 is referred to to search for those GOPs whose recording term has expired from among the recorded GOPs 123 to 129 and erase the searched out GOPs beginning with the GOP which has the lowest priority shown in FIG.12. Here, one of the GOPs 123 to 125 which have the lowest priority from among the GOPs 123 to 127 whose recording term has expired is erased. It is to be noted that, if those video data whose recording term has expired are not present, then those of the recorded data whose priority is lowest are erased beginning with the oldest one of them.

Accordingly, with the present endless video recording apparatus (digital video processing system), if the user sets a priority for each of video contents in advance, then the video data are erased beginning with those video data which have the lowest priority. Therefore, there is an advantage that endless recording can be performed while those data which the user principally wants to enjoy are left preferentially. Further, where data of a plurality of video images recorded have an equal priority, they are overwritten beginning with those whose recording time is oldest, there is an advantage that those video data which have a higher priority and are newer can be left for a longer period of time.

Furthermore, there is an advantage that, if time till which the user recognizes that video data are valuable as information is set as a recording term, then endless recording can be performed while those data whose degree of freshness of information is high and whose priority of video contents is high are left preferentially.

(b) Description of the Second Embodiment

Subsequently, an endless video recording apparatus as a second embodiment of the present invention is described.

The endless video recording apparatus (digital video processing system) of the present embodiment has a similar basic configuration to that of the first embodiment described above, but is different in the method of erasing a mark by a mark erasure section 114 shown in FIG. 2. Further, as a result of the difference in the method of erasing a mark, the endless video recording apparatus (digital video processing system) of the present embodiment is different from that of the first embodiment also in terms of the recording timing of video data by the endless recording section 100, the updating timing of the databases 116 and 117 by the mark management section 112, and so forth.

In the following, a configuration of the endless video recording apparatus (digital video processing system) of the present embodiment is described principally in regard to the differences from that of the first embodiment described hereinabove. It is to be noted that, since the basic configuration of the present endless video recording apparatus (digital video processing system) is similar to that of the first embodiment, components thereof are denoted by reference characters used in FIGS. 1 and 2. It is to be noted, however, that description of any component of the same function is omitted here.

In the present embodiment, when a new GOP is recorded on another GOP or GOPs recorded already, the mark erasure section 114 specifies an area into which the new GOP is to be recorded based on the position of a mark and the size of the GOP, and erases a mark or marks corresponding to the old GOP or GOPs which overlap with the specified area. In short, the area into which a new GOP is to be recorded is not assumed as an overwrite allowing area based only on the position of a mark as in the first embodiment, but is specified accurately based on data actually obtained.

To this end, in the present embodiment, the endless recording section 100 does not record inputted video data into the endless recording area in the recording medium 12 whenever occasion arises, but temporarily stores inputted video data into the data memory 9 until all video data which compose the GOP corresponding to the set mark are inputted and then records the inputted video data in a unit of a GOP into the endless recording area when all video data are inputted, that is, when the top data of the next GOP is inputted. Further, since erasure of a mark is performed after all video data which compose a GOP in this manner are inputted, also updating of the databases 116 and 117 by the mark management section 112 is performed collectively at the same time as the recording of the GOP.

Now, operation upon endless recording of the endless video recording apparatus (digital video processing system) as the second embodiment of the present invention having the configuration described above is described with reference to a flow chart (steps C100 to C200) of FIG. 13 and diagrammatic views of FIGS. 14 and 15. It is to be noted that, since operation upon playback is similar to that in the first embodiment, description thereof is omitted here.

Figure 13:
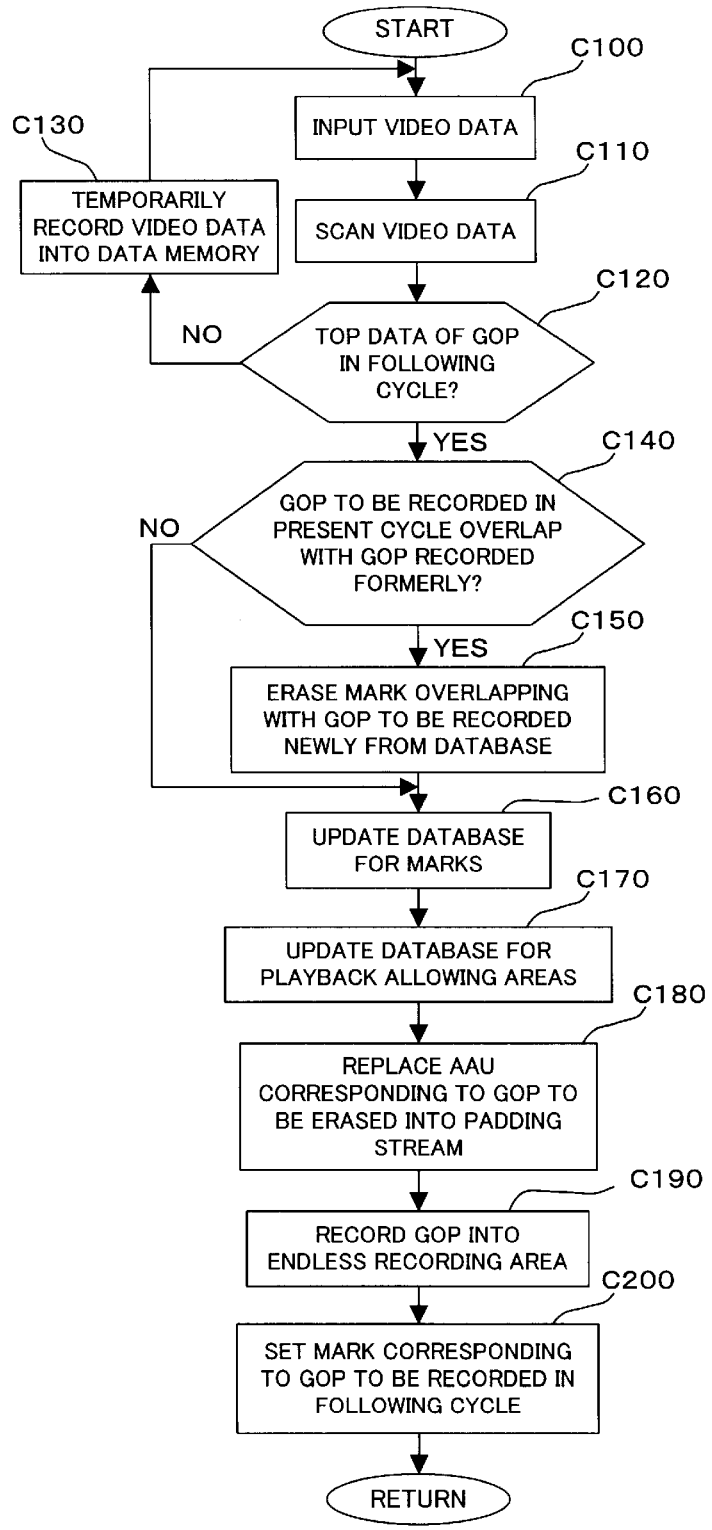
FIG. 13 is a flow chart illustrating operation upon endless recording by an endless video recording apparatus as a second embodiment of the present invention.

First, upon endless recording, digitized video data are inputted to the endless recording section 100 through the video storage section 103 as seen in FIG. 13 (step C100). Then, the inputted video data are scanned (step C110), and it is discriminated whether or not the video data are data to which a mark should be set, that is, whether or not the video data are top data of a GOP (step C120). At this time, if the scanned video data are not the top data of a GOP (refer to the NO route of step C120), then the processing advances to step C130, at which the video data are recorded into the data memory 9, and the foregoing processing is repeated until the top data of a GOP are scanned.

On the other hand, if the scanned video data are top data of a GOP (refer to the YES route of step C120), then an area into which the GOP is to be recorded is specified based on the size of a GOP in the preceding cycle recorded in the data memory 9 and the position of a corresponding mark set in the preceding cycle, and it is discriminated whether or not the specified area overlaps with the GOP recorded formerly (step C140). If the specified area does not overlap with the GOP recorded formerly (refer to the NO route of step C140), then the processing advances to step C160.

On the other hand, if the specified area overlaps with the GOP recorded formerly (refer to the YES route of step C140), then the mark corresponding to the old GOP which overlaps with the area in which the GOP in the preceding cycle is recorded is erased from the database 116 (step C150). Then, the position of the mark set in the preceding cycle and corresponding to the GOP to be recorded newly, the size of the GOP, the recording time of the GOP, the position of an AAU corresponding to the GOP, contents of the recorded video data, the priority of the data, and the recording term are recorded into the database 116 to update the database 116 by the mark management section 114 (step C160). Further, together with the updating of the database 116, also the database 117 for playback allowing areas is updated based on the position information and so forth of the mark recorded in the database 116 by the playback allowing area setting section 115 (step C170).

Furthermore, based on the relationship between the marks and the corresponding AAUs recorded in the database 116, it is confirmed whether or not an AAU corresponding to the old GOP to be erased by overwriting remains, and if such an AAU remains, then the pertaining AAU is replaced into a padding stream (step C180).

Then, after the processing described above, the endless recording section 100 records the GOP in the preceding cycle recorded in the data memory 9 newly into the endless recording area (step C190) and then sets a mark corresponding to the GOP in the present cycle to the position of the top data of the GOP (step C200). It is to be noted that, upon endless recording, information relating to the entire video image is stored by a process separate from the process described above by the header recording section 101.

Figure 14:
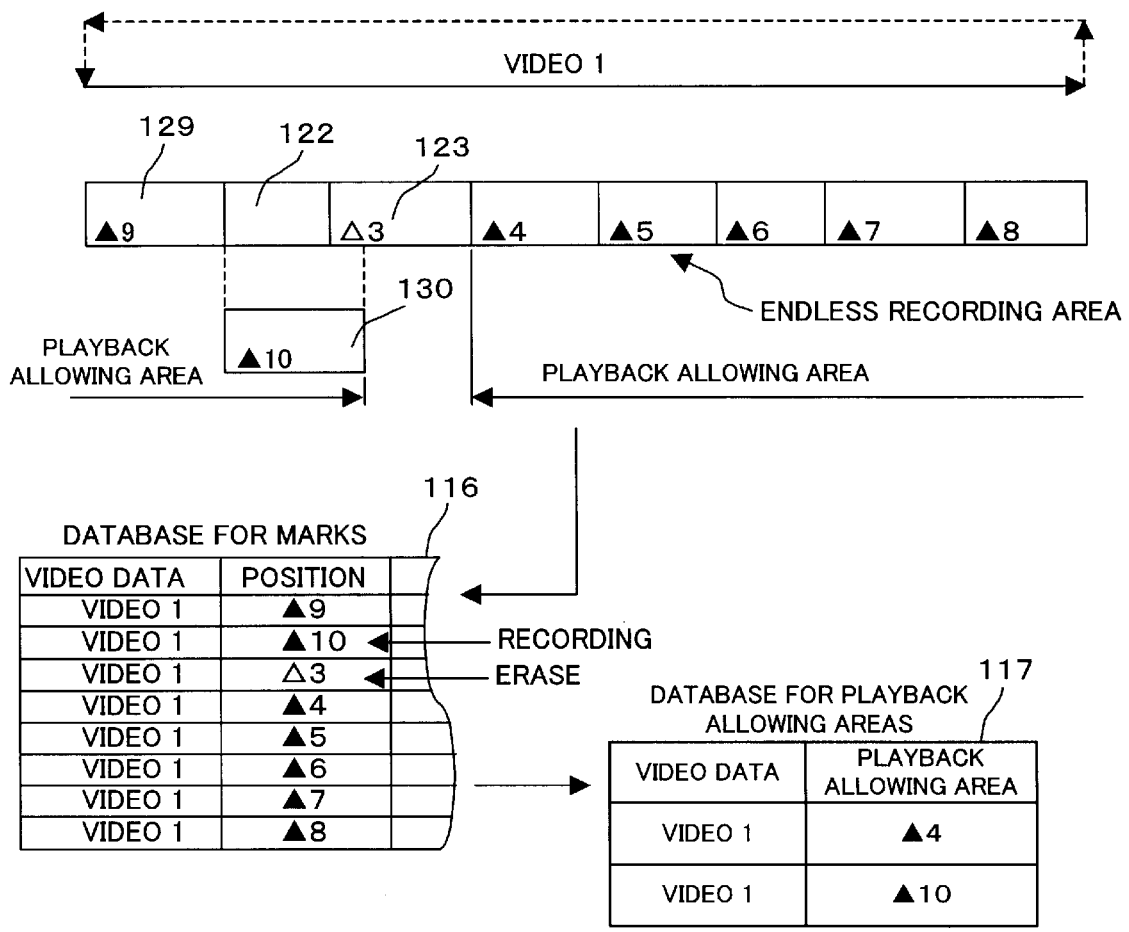
FIG. 14 is a schematic view illustrating operation upon endless recording by the endless video recording apparatus as the second embodiment of the present invention and is a view showing a state at time T.
Figure 15:
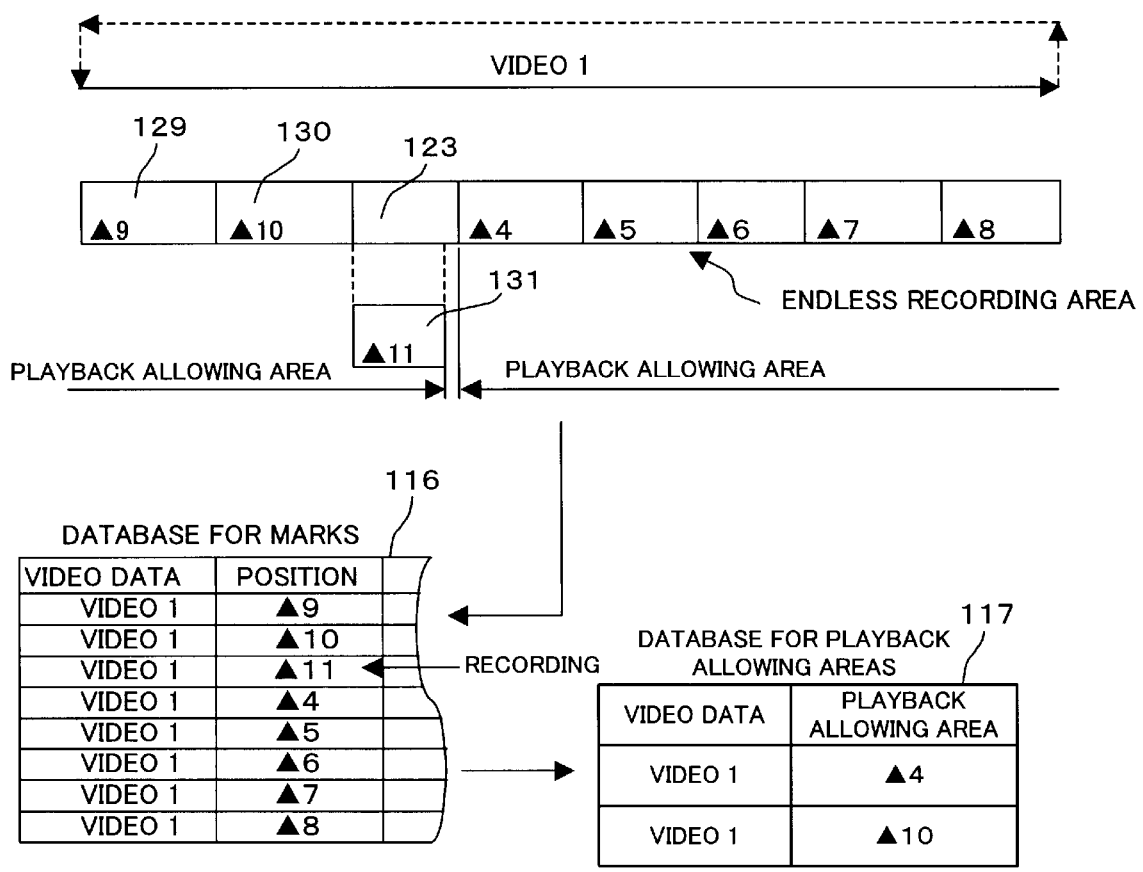
FIG. 15 is a schematic view illustrating operation upon endless recording by the endless video recording apparatus as the second embodiment of the present invention and is a view showing a state at time T+1.

Here, FIGS. 14 and 15 show endless recording states at times T and T+1, respectively. In the following, the processing described above is described in more detail with reference to FIGS. 14 and 15.

First, it is assumed that top data of a GOP for the following cycle are inputted at time T. At this point of time, the mark erasure section 114 specifies, based on the size of the GOP 130 recorded in the data memory 9 and to be recorded in the present cycle and the position of the corresponding mark ▲10 set in the present cycle, an area into which the GOP 130 is to be recorded, and discriminates whether or not the specified area overlaps with the recorded GOP. Here, since the GOPs 122 and 123 overlap with the specified GOP and the mark corresponding to the GOP 122 is erased already, the mark ▲3 corresponding to the GOP 123 is erased.

After the mark ▲3 is erased by the mark erasure section 114, the mark management section 112 erases all of data corresponding to the mark ▲3 from the database 116 and records the data corresponding to the mark ▲10 to update the database 116. Further, the playback allowing area setting section 115 changes the playback allowing area in response to the updating of the database 116. Here, since the mark ▲10 is set and the mark ▲3 is erased, the playback allowing area becomes the range from the mark ▲4 to a GOP corresponding to the mark ▲10. The mark management section 112 thus changes the playback start point in the database 117 to the mark ▲4 in response to the change of the playback allowing area and changes the end point to the mark ▲10 to update the database 117.

Then, the GOP 130 read out from the data memory 9 simultaneously with the updating of the databases 116 and 117 is recorded following the GOP 129 recorded in the preceding cycle, and then the mark ▲11 corresponding to the GOP 131 is set to the trailing end of the GOP 130 recorded in the present cycle.

Now, it is assumed that a GOP for the following cycle is inputted following the GOP 131 at time T+1. At this point of time, the mark erasure section 114 specifies an area into which the GOP 131 is to be recorded based on the size of the GOP 131 recorded in the data memory 9 and to be recorded in the present cycle and the position of the corresponding mark ▲11 set in the present cycle, and discriminates whether or not the specified area overlaps with a GOP recorded formerly. Here, only the GOP 123 overlaps with the specified area. However, since the mark corresponding to the GOP 123 has already been erased, erasure by the mark erasure section 114 is not performed.

The mark management section 112 records the data corresponding to the mark ▲11 into the database 116 to update the database 116. Further, the playback allowing area setting section 115 changes the playback allowing area in response to the updating of the database 116. Here, since a mark ▲11 is set newly, the playback allowing area becomes the range from the mark ▲4 to a GOP corresponding to the mark ▲11. Thus, the mark management section 112 changes the playback start point in the database 117 in response to the change of the playback allowing area to the mark ▲11 to update the database 117.

Then, simultaneously with the updating of the databases 116 and 117, the GOP 131 read out from the data memory 9 is recorded following the GOP 130 recorded in the preceding cycle, and then a mark ▲12 corresponding to a GOP 132 is set to the trailing end of the GOP 131 recorded in the present cycle.

While operation upon endless recording of the endless video recording apparatus (digital video processing system) as the second embodiment of the present invention is described in detail above, as can be recognized from the foregoing description, with the present endless video recording apparatus (digital video processing system), even if video data recorded formerly are destroyed by overwriting of new video data thereon, a playback allowing area can be set except the area by referring to the database 116 similarly to the first embodiment. Consequently, there is an advantage that seamless video playback is allowed without suffering from a disorder of video images which may be caused by playback of the destroyed video data.

Further, the playback allowing area is set in an interlocking relationship with the database 116 for marks and is updated every time a mark is set/erased. Therefore, also the advantage that, even when playback is performed while endless recording is proceeding, seamless video playback can always be performed is similar to that of the first embodiment.

Furthermore, in the present embodiment, since an area into which a new GOP is to be recorded is specified based on the position of a mark or marks and the size of a corresponding GOP or GOPs and any mark present in the specified area is erased from the database 116, there is an advantage that the playback allowing area can be set more accurately. This is particularly effective where the dispersion in size among GOPs is great.

(c) Description of the Third Embodiment

Subsequently, an endless video recording apparatus as a third embodiment of the present invention is described.

A general configuration of the endless video recording apparatus to which the endless recording apparatus of the present embodiment is applied is represented by the block diagram shown in FIG. 1 similarly to the first embodiment described hereinabove. Accordingly, description of the general configuration shown in FIG. 1 is omitted here, and functions obtained by execution by the CPU 3 of any of programs and applications recorded in the program memory 8 are described with reference to a functional block diagram of FIG. 16. It is to be noted that description of components having similar functions to those of the first embodiment or the second embodiment described hereinabove is omitted here.

Figure 16:
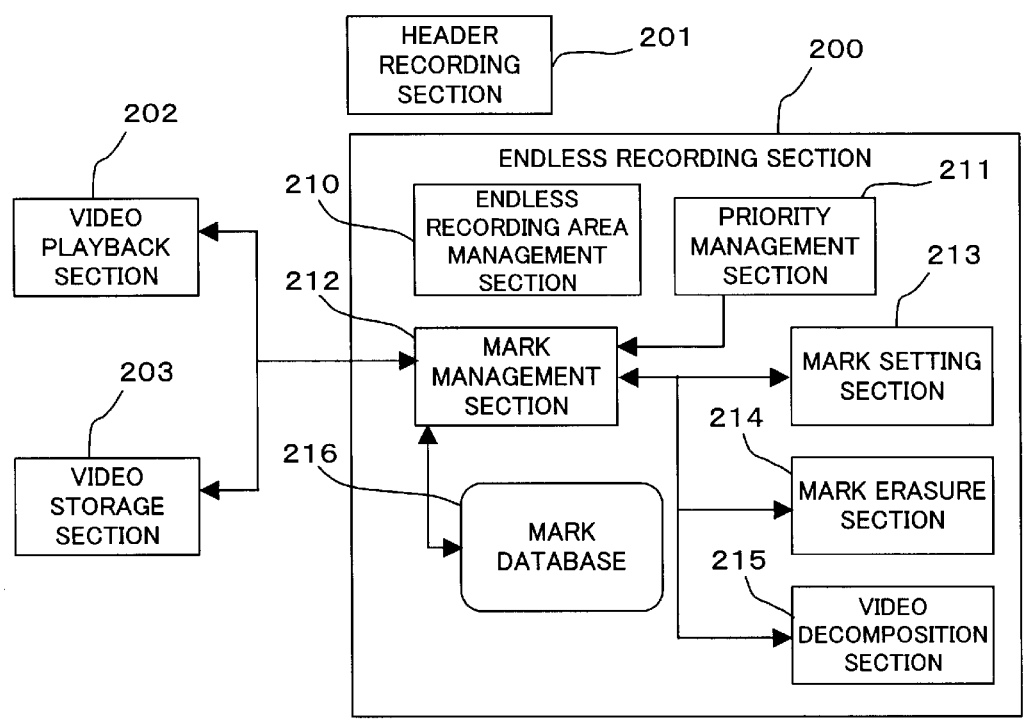
FIG. 16 is a functional block diagram of an endless video recording apparatus as a third embodiment of the present invention.

As seen in FIG. 16, in the present embodiment, the CPU 3 functions as an endless recording section (video data recording means) 200, a header recording section (header recording area setting means) 201, a video playback section (video playback means) 202, and a video storage section 203 by executing a program and an application recorded in the program memory 8.

Further, endless recording of video data is achieved by cooperation of the endless recording section 200 of the functioning elements described above with an endless recording area management section (endless recording area setting means) 210, a priority management section (priority setting means) 211, a mark management section (mark management means) 212, a mark setting section (mark setting means) 213, a mark erasure section (mark erasure means) 214, a video decomposition section (mark decomposition means) 215 and a mark database 216 which are functioning elements of the endless recording section 200.

When endless recording is to be performed, the endless recording area management section 210 first sets an endless recording area to be used for endless recording in the recording area in the recording medium 12. Since the function of the endless recording area management section 210 is similar to that of the endless recording area management section 110 in the first embodiment described hereinabove, description thereof is omitted.

The endless recording section 200 executes endless recording within the endless recording area set by the endless recording area management section 210. In particular, the endless recording section 200 successively records video data into the set endless recording area beginning with the top address of the endless area, and when video data are recorded fully into the endless recording area, the endless recording section 200 records new video data by overwriting on the formerly recorded video data beginning with the top of the endless recording area again thereby to realize endless recording.

Figure 17:
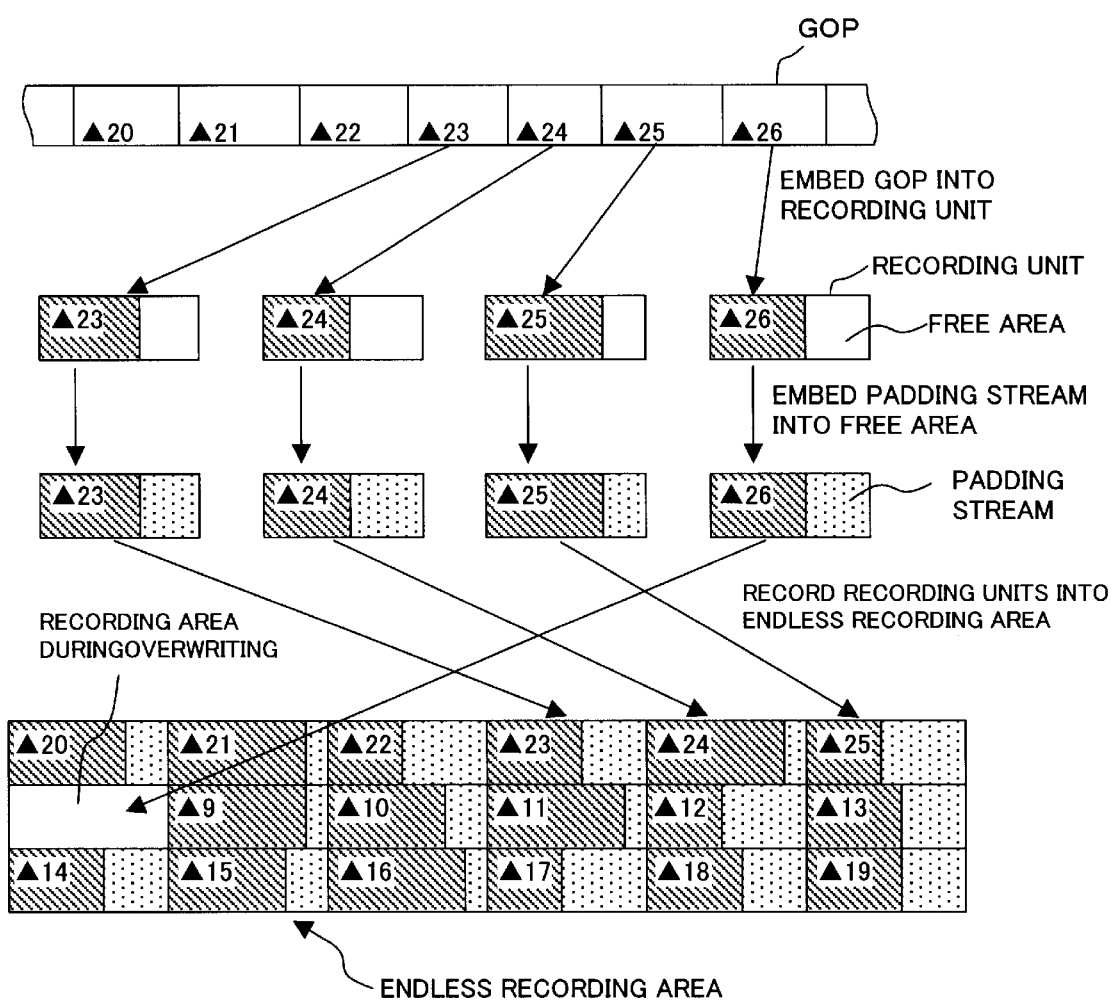
FIG. 17 is a view illustrating a mark setting method by the endless video recording apparatus as the third embodiment of the present invention.

It is to be noted that, in the present embodiment, video data are not recorded as they are in their form but recorded in such a form that they are embedded in a recording unit (recording cell) having a predetermined size (data amount). This is described more particularly with reference to FIG. 17. In particular, in the endless recording section 200, the mark setting section 213 first sets a mark for each particular coding unit to inputted video data. More particularly, for example, one GOP in the MPEG system is composed of video data of 15 pictures, and the mark setting section 213 sets a mark at the top position of the GOP as seen in FIG. 17.

The endless recording section 200 temporarily records inputted video data until all video data which compose GOPs corresponding to the set marks are inputted. Then, when all video data are inputted, the video decomposition section 215 decomposes the video data into mark units, here, into GOP units and embeds the decomposed video data (GOPs) into predetermined recording units. The size of the recording units is set greater than an estimated maximum value of a GOP so that a GOP may not protrude from a recording unit.

At this time, since a GOP is embedded into a recording unit which has a capacity greater than that of the GOP as described above, a gap (invalid area) appears in the recording unit. Therefore, the endless recording section 200 inserts a padding stream into the invalid area appearing in the recording unit and records the recording unit, in which the GOP is embedded, into the endless recording area after the insertion.

The marks set by the mark setting section 213 are managed by the mark management section 212. The mark management section 212 prepares a mark database 216 similar to the database 116 in the first embodiment shown in FIG. 4 and manages the marks using the mark database 216. In the mark database 216, the size of a GOP corresponding to each mark (size of the GOP occupying in the recording unit), the recording time of the GOP, the position of an AAU corresponding to the GOP, contents of recorded video data, the priority of the data and the recording term are recorded in a coordinated relationship with the position of the mark in the endless recording area (top address of the recording unit corresponding to the mark), and the data are recorded in the descending order beginning with the top mark in the endless recording area.

The mark management section 212 additionally writes, every time marks are set newly and recording units corresponding to the marks are recorded into the endless recording area, data corresponding to the set marks into the mark database 216. Then, when recording units are recorded fully into the endless recording area until recording is to be performed for the top of the endless recording area again, recording of a mark returns to the top of the mark database 216 and recording units corresponding to set marks are recorded by overwriting on the recording units recorded already. At this time, since the recording units have a fixed size and the range over which overwriting is performed by one overwriting operation is fixed, the new recording units and the old recording units on which the new recording units are to be overwritten coincide fully with each other.

In order to record new recording units by overwriting on recording units recorded already in this manner, in the endless recording section 200, marks corresponding to the old recording units on which the new recording units are to be overwritten are erased from the mark database 216 by the mark erasure section 214. Then, data corresponding to the newly set marks are additionally written, and then the mark database 216 is updated.

Figure 18:
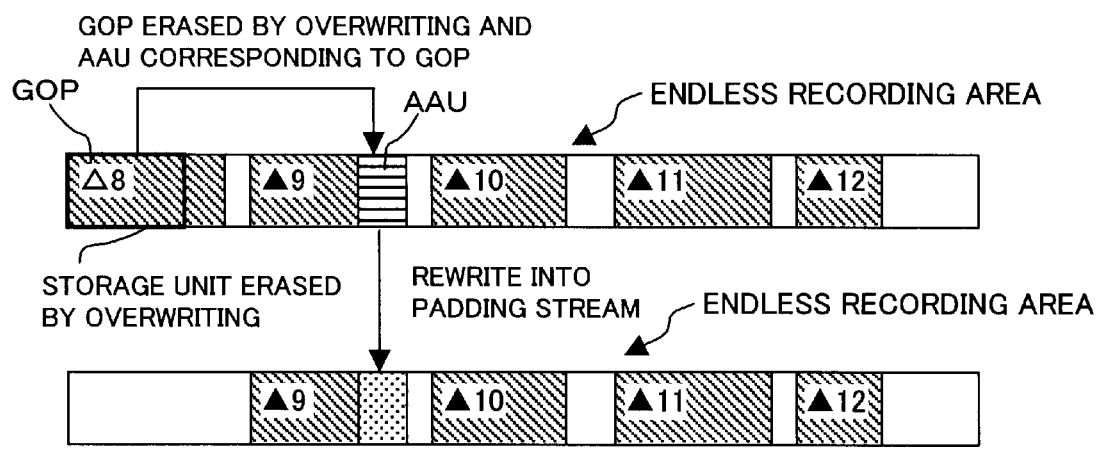
FIG. 18 is a schematic view illustrating an AAU processing method by the endless video recording apparatus as the third embodiment of the present invention.

Further, at this time, when the recording units are overwritten, there is the possibility that audio data (AAUs) corresponding to the video data (GOPs) in the recording units erased by overwriting may remain in the endless recording area. If AAUs remain without being erased in this manner, then data only of audio sound free from a video image are outputted upon playback. Therefore, upon overwriting of recording units, the endless recording section 200 confirms based on the relationship between the GOPs and the corresponding AAUs recorded in the mark database 216 whether or not an AAU corresponding to an old GOP erased by overwriting remains. Then, if such an AUU remains, then the endless recording section 200 replaces the pertaining AAU into a padding stream as seen in FIG. 18.

The mark management section 212 prepares the mark database 216 described above on the data memory 9 and secures a database recording area in the recording medium 12, and then records the database 216 temporarily recorded on the data memory 9 at predetermined intervals of time into the database recording area. It is to be noted that setting of the time intervals for overwriting of the mark database 216 into the data recording area is similar to that in the first embodiment described hereinabove, and therefore, description of such setting is omitted.

Also the priority management section 211 has similar functions to those of the priority management section 111 in the first embodiment described hereinabove, and therefore, description of it is omitted here. Similarly, the header recording section 201 and the video storage section 203 have similar functions to those of the header recording section 101 and the video storage section 103 in the first embodiment described hereinabove, respectively, and therefore, description of them is omitted.

The video playback section 202 is described. The video playback section 202 is means for playing back video images recorded by endless recording and serves also as an interface between the video decoding section 7 and the recording medium 12. When a video image is to be played back, the video playback section 202 first reads in basic information essentially required for playback of the video image from the header recording area, and then searches for a playback starting location in a unit of a mark from the mark database 216, and reads out video data corresponding to the mark thus searched out from the endless recording area to start playback. Further, the video playback section 202 performs the search for a mark from within the mark database 216 successively in the forward direction or the reverse direction to realize fast feeding or rewinding of a video image to be played back.

Subsequently, operation and effects of the endless recording video recording apparatus (digital video processing system) as the third embodiment of the present invention having such a configuration as described above are described with reference to FIGS. 19 to 23.

First, operation upon endless recording is described with reference to a flow chart (steps D100 to D210) shown in FIG. 19.

Figure 19:
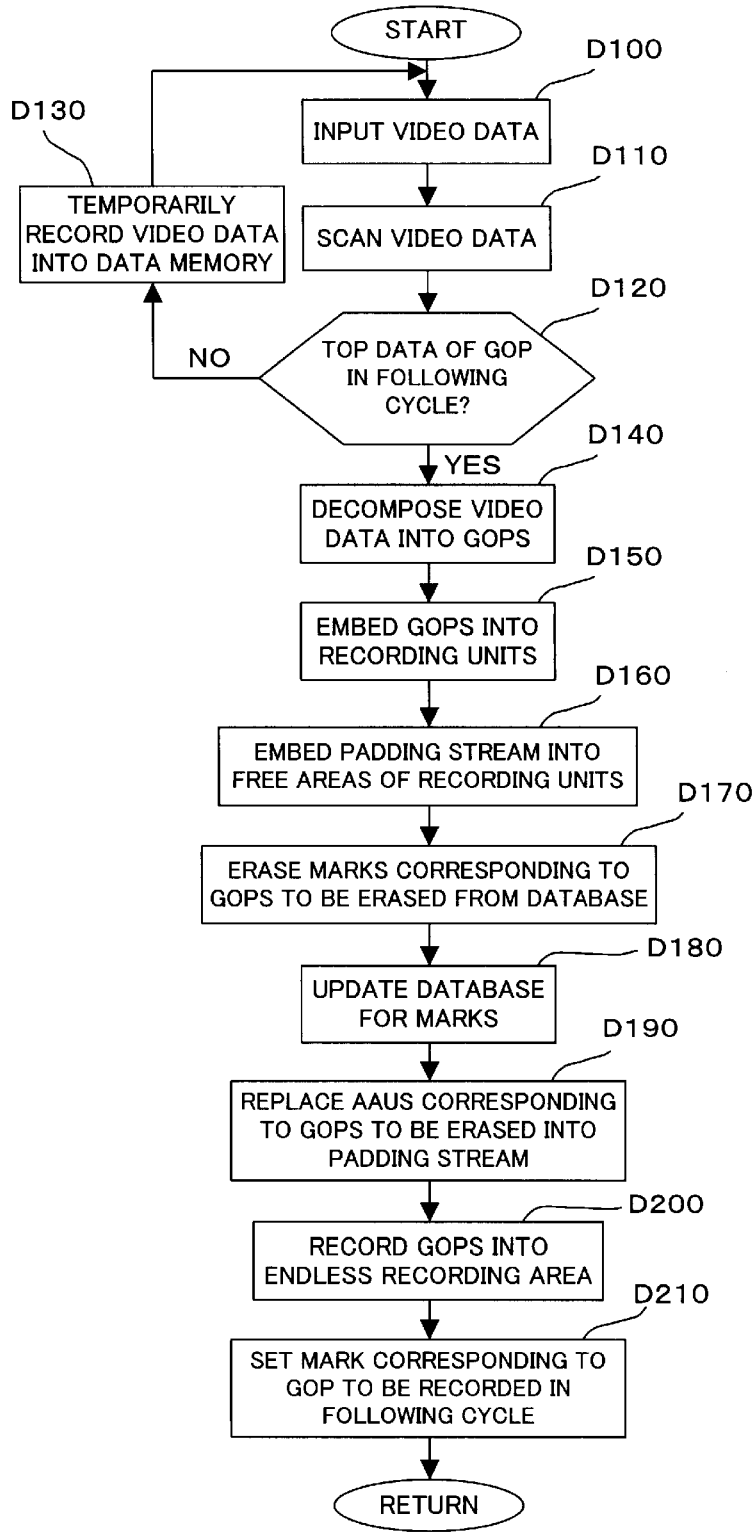
FIG. 19 is a flow chart illustrating operation upon endless recording by the endless video recording apparatus as the third embodiment of the present invention.

First, upon endless recording, digitized video data are inputted to the endless recording section 200 through the video storage section 203 as seen in FIG. 19 (step D100). Then, the inputted video data are scanned (step D110), and it is discriminated whether or not the scanned video data are data to which a mark is to be set, that is, whether or not the scanned video data are top data of a GOP (step D120). At this time, if the scanned video data are not top data of a GOP (refer to the NO route of step D120), then the processing advances to step D130, at which the video data are recorded into the data memory 9, and the processing described above is repeated until top data of a GOP are scanned.

On the other hand, if the scanned video data are top data of a GOP (refer to the YES route of step D120), then the video data stored in the data memory 9 are decomposed into GOP units by the video decomposition section 215 (step D140). Then, the decomposed GOPs are embedded into predetermined recording units (step D150), and a padding stream is filled into gaps (invalid areas) between the recording units and the GOPs (step D160).

Then, marks corresponding to old recording units on which the recording units are to be overwritten are erased from the mark database 216 by the mark erasure section 214 (step D170). Then, the positions of the marks corresponding to the new recording units in the endless recording area (the top addresses of the recording units), the sizes of the GOPs (the sizes of the GOPs occupying in the recording units), the recording times, the positions of AAUs corresponding to the GOPs, contents of the video data recorded, the priorities of the data, and the recording terms are recorded into the mark database 216 to update the mark database 216 (step D180).

Further, it is confirmed based on the relationship between the GOPs and the corresponding AAUs recorded in the mark database 216 whether or not an AAU which corresponds to an old GOP to be erased by overwriting remains. If such an AAU remains, then the pertaining AAU is replaced into a padding stream (step D190).

Then, after the processing described above is completed, the endless recording section 200 newly records the recording units recorded in the data memory 9 into the endless recording area (step D200) and then sets a mark corresponding to the GOP in the present cycle to the position of the top data of the GOP (step D210). It is to be noted that information relating to an entire video image upon endless recording is stored by a process separate from the process described above by the header recording section 201.

Figure 20:
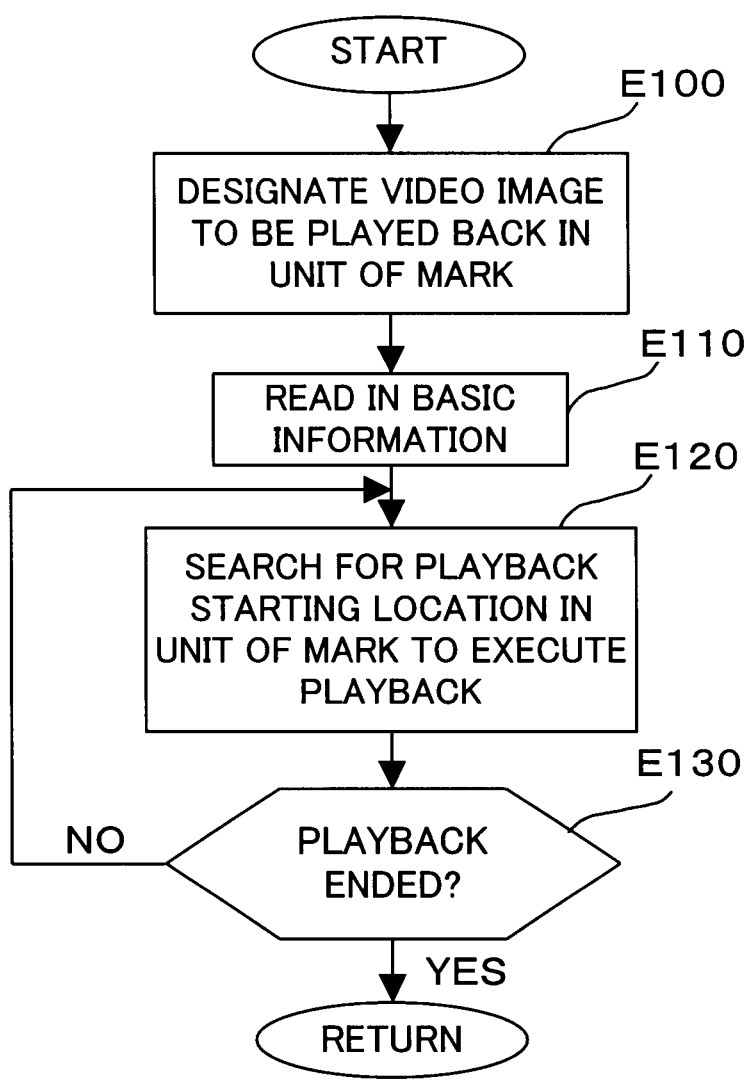
FIG. 20 is a flow chart illustrating operation upon playback by the endless video recording apparatus as the third embodiment of the present invention.

Now, operation upon playback is described with reference to a flow chart (steps E100 to E130) shown in FIG. 20.

In order to play back a video image recorded during endless recording, a video image to be played back is first designated in a unit of a mark (step E100), and basic information relating to a video image corresponding to the designated mark is read in from the head recording information secured separately from the endless recording area in the recording medium 12 (step E110).

Then, a playback starting location of the video image is searched for in a unit of a mark from within the mark database 216, and a recording unit corresponding to the searched out mark is read out from the endless recording area to play back the video image (step E120) At this time, although a recording unit read out from the endless recording area has a padding stream embedded in a gap portion thereof together with a GOP of the video data, when it is processed by the video playback section 202, the padding stream is abandoned automatically and only the GOP is played back.

Then, it is discriminated whether or not a playback ending operation is performed (step E130), and the processing at step E120 is executed repetitively until a playback ending operation is performed.

While operation upon endless recording and playback of the endless video recording apparatus (digital video processing system) as the third embodiment of the present invention is described in detail above, as can be recognized from the foregoing description, with the present endless video recording apparatus (digital video processing system), even if GOPs have a dispersion in size, since an old video data GOP recorded formerly is erased fully by overwriting of a new recording unit by successively recording video data for each recording unit of a predetermined size, any GOP recorded formerly does not partly remain at all. Accordingly, there is an advantage that seamless video playback can be achieved without suffering from a disorder of video images which is caused by playback of destroyed video data.

Further, since an old GOP recorded formerly is erased completely, there is an advantage also that there is no need to search for a playback allowing area in the endless recording area every time playback is started as in the first embodiment and the second embodiment described hereinabove.

Furthermore, since a padding stream is embedded into a free area in a recording unit in which a GOP is embedded and the resulting recording unit is recorded into the endless recording area, there is an advantage also that, upon playback, invalid data part in the recording unit need not be removed and a data stream of the MPEG can be decoded and played back while maintaining the matching property.

Besides, when a GOP recorded in an old recording unit is erased by overwriting of a new recording unit thereon, an AAU corresponding to the erased GOP is replaced into and recorded as a padding stream based on the relationship between the GOPs and the AAUs recorded in the mark database 216. Therefore, there is an advantage also that outputting of data only for audio sound free from video images which arises from the fact that an AAU corresponding to a GOP erased by overwriting remains can be prevented.

Further, a mark is set to each of recording units and the positions of the marks are recorded in the mark database 216, the position of a recording unit on the endless recording area can be searched for using a mark. Consequently, there is an advantage that a video image to be played back can be searched out readily and quickly. Furthermore, there is an advantage also that a fast feeding function and a rewinding function can be realized readily by performing a search for a mark from within the mark database 216 successively in the forward direction or the reverse direction.

In addition to the advantages described above, the present endless video recording apparatus (digital video processing system) has the following advantages similar to those of the first and second embodiments.

In particular, also with the present endless video recording apparatus (digital video processing system), the area for endless recording can be dynamically varied in accordance with a variation of the free area. Further, the endless recording area management section 210 normally supervises the area for endless recording and accepts an area releasing request from another application.

Figure 21:
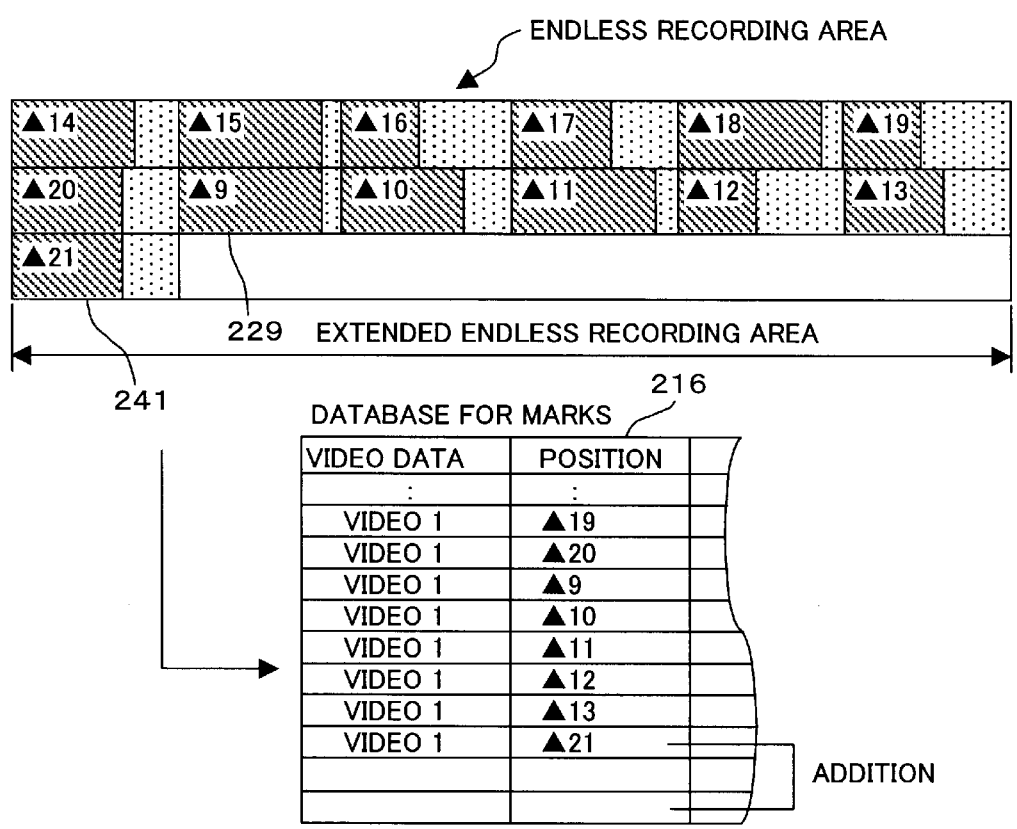
FIG. 21 is a schematic view illustrating extension of an endless recording area by the endless video recording apparatus as the third embodiment of the present invention.
Figure 22:
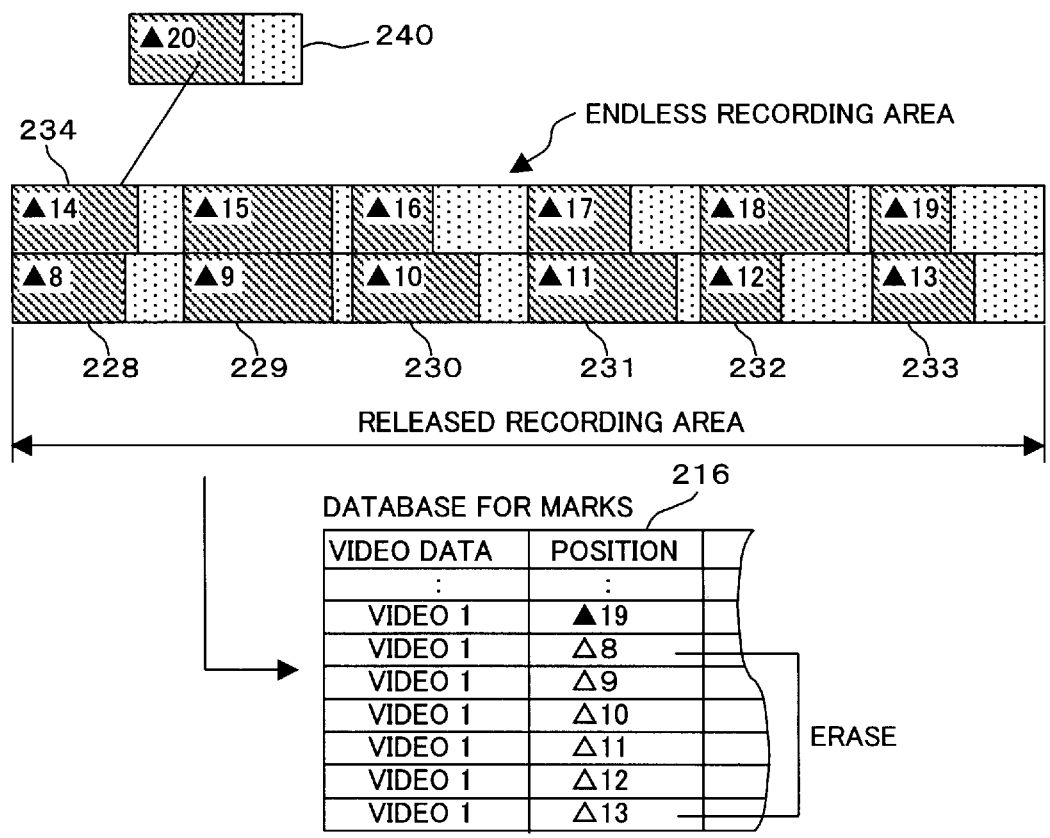
FIG. 22 is a schematic view illustrating reduction of the endless recording area by the endless video recording apparatus as the third embodiment of the present invention.

Then, for example, if the area which can be used for endless recording increases as seen in FIG. 21, then a recording unit 241 to be recorded newly is not overwritten on an old recording unit 229 but recorded into the newly extended area, and the extended new area is added to the mark database 216. On the other hand, if a request to release the endless recording area is received, then old recording units 228 to 233 are erased as seen in FIG. 22 to release the recording area, and a new recording unit 240 is recorded by overwriting on an oldest recording unit 234 which remains without being erased and data corresponding to the released area are erased from the database 116.

Accordingly, with the present endless video recording apparatus (digital video processing system), there is an advantage that it becomes possible to efficiently utilize the recording area in the recording medium 12 and endless recording can be continued without disturbing execution of an important application. Further, where a predetermined area in the recording medium 12 is set as an endless recording area preferentially to a request from another application, there is an advantage that endless recording can be performed with certainty without depending upon the execution situation of the different application.

Figure 23:
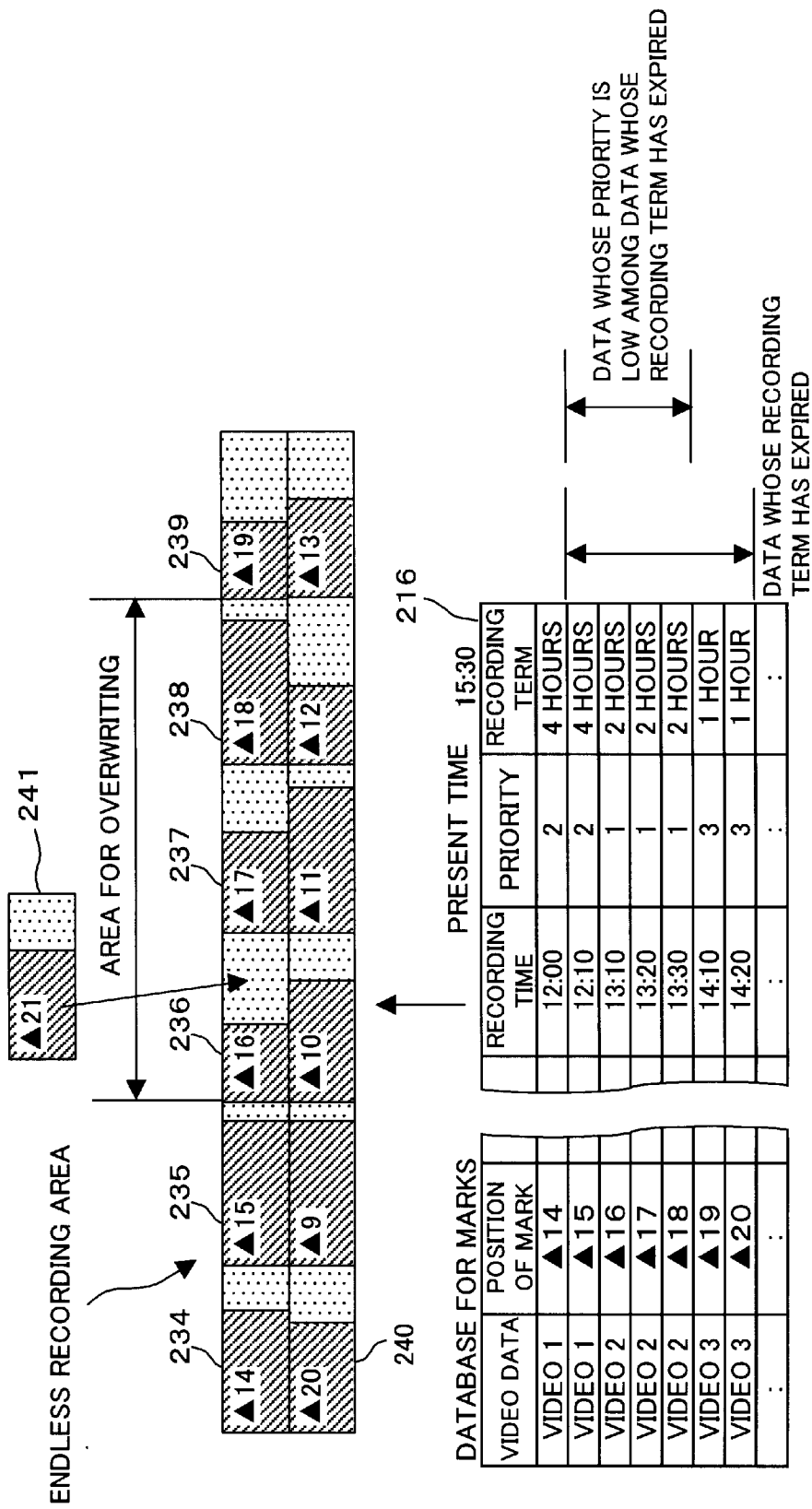
FIG. 23 is a schematic view illustrating a setting method of an overwriting area by the endless video recording apparatus as the third embodiment of the present invention.

Further, with the present endless video recording apparatus (digital video processing system), when video data are recorded, a priority and a recording term suitable for video contents are recorded corresponding to each recording unit into the mark database 216. Thus, for example, when a new recording unit 241 is to be recorded as shown in FIG. 23, the mark database 216 is referred to to examine recording units 236 to 240 whose recording term has expired among the recording units and examine a set of the recording units 236 to 238 whose priority is lowest among the recording units 236 to 240. Then, the recording units 236 to 238 whose priority is lowest are erased beginning with the oldest recording unit 236.

Accordingly, with the present endless video recording apparatus (digital video processing system), there is an advantage that endless recording can be performed while those data which the user principally wants to enjoy are left preferentially and those video data which have a higher priority and are newer can be left for a longer period of time. Further, there is an advantage also that endless recording can be performed while those data whose degree of freshness of information is high and whose priority of video contents is high are left preferentially.

(d) Description of the Fourth Embodiment

Subsequently, an endless video recording apparatus as a fourth embodiment of the present invention is described.

A general configuration of the endless video recording apparatus to which the endless recording apparatus of the present embodiment is applied is represented by the block diagram shown in FIG. 1 similarly to the first embodiment described hereinabove. Accordingly, description of the general configuration shown in FIG. 1 is omitted here, and functions obtained by execution by the CPU 3 of programs and applications recorded in the program memory 8 are described with reference to a functional block diagram of FIG. 24. It is to be noted that description of components having similar functions to those of the embodiments described hereinabove is omitted here.

Figure 24:
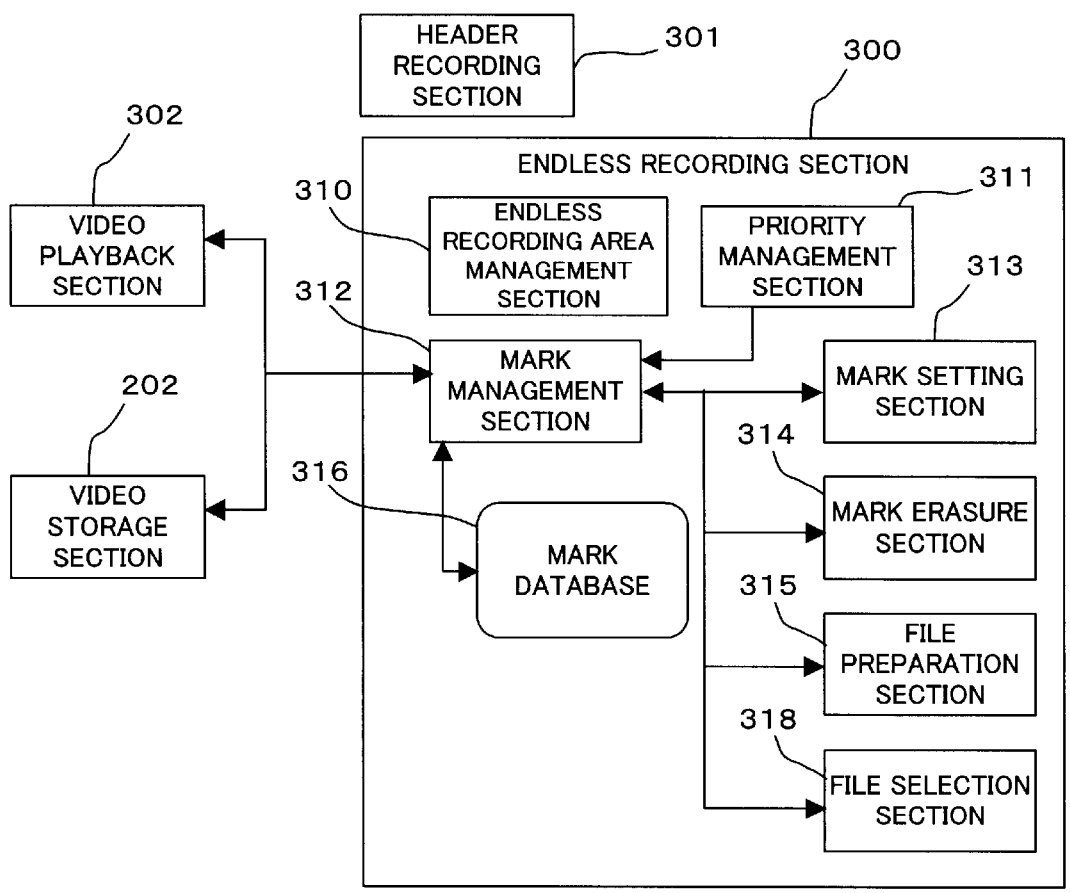
FIG. 24 is a functional block diagram showing an endless video recording apparatus as a fourth embodiment of the present invention.

As seen in FIG. 24, in the present embodiment, the CPU 3 functions as an endless recording section (video data recording means) 300, a header recording section (header recording area setting means) 301, a video playback section (video playback means) 302, and a video storage section 303 by executing the programs and applications recorded in the program memory 8.

Further, endless recording of video data is achieved by cooperation of the endless recording section 300 of the functioning elements described above with an endless recording area management section (endless recording area setting means) 310, a priority management section (priority setting means) 311, a mark management section (mark management means) 312, a mark setting section (mark setting means) 313, a mark erasure section 314, a file preparation section (file preparation means) 315, a file selection section (file preparation means) 318 and a mark database 316 which are functioning elements of the endless recording section 300.

When endless recording is to be performed, the endless recording area management section 310 first sets an endless recording area to be used for endless recording in the recording area in the recording medium 12. It is to be noted that, since the function of the endless recording area management section 310 is similar to that of the endless recording area management section 110 in the first embodiment described hereinabove, description thereof is omitted.

In the present embodiment, a plurality of files are prepared in the set endless recording area by the video decomposition section 215. The number of files to be prepared can be set arbitrarily, and such files can be set to arbitrary sizes which can be included in the endless recording area.

The endless recording section 300 executes endless recording using the files prepared by the file preparation section 315. In particular, the endless recording section 300 successively records inputted video data into a file, and if the file is filled with video data, then the endless recording section 300 records the inputted video data into a next file. Further, if all of the files are filled with video data, then one of the files in which video data are recorded is deleted and a new file is prepared, and video data are recorded into the newly prepared file, thereby realizing endless recording.

Figure 25:
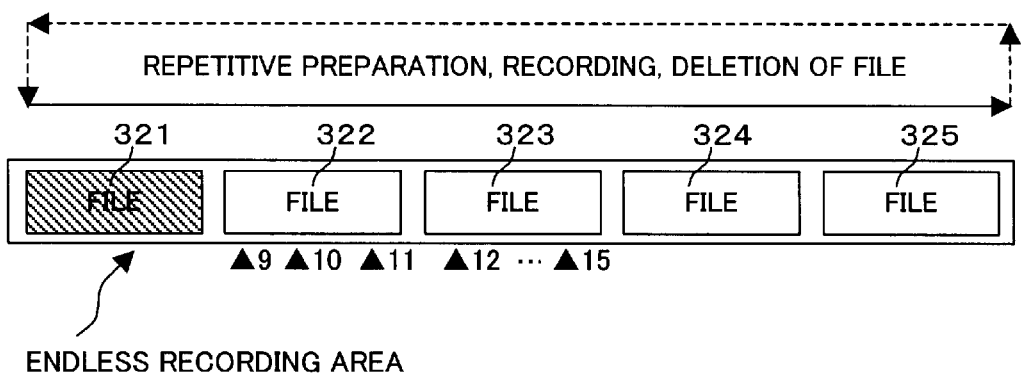
FIG. 25 is a view illustrating a recording method of video data into a file by the endless video recording apparatus as the fourth embodiment of the present invention.

For example, in the case illustrated in FIG. 25, if a file 321 is filled, then video data are successively recorded into files 322, 323, 324 and 325. Then, if all of the files 321 to 325 are filled, then one of the files 321 to 325 is deleted and a new file is prepared. Particularly which one of the files should be deleted is hereinafter described.

At this time, the endless recording section 300 successively records video data in a particular coding unit. For example, in the case of video data coded by the MPEG system, video data are recorded in a unit of a GOP into a file, and if the file is filled until there remains no area into which a new GOP can be recorded, then the GOP is recorded into the next file.

Further, in the endless recording section 300, a mark is set for each particular coding unit to inputted video data by the mark setting section 313. For example, in the case of video data coded by the MPEG system as described above, a mark is set to the top position of a GOP.

The marks set by the mark setting section 313 are managed by the mark management section 312. The mark management section 312 prepares such a mark database 316 as shown in FIG. 26 and manages the marks using the mark database 316. In the mark database 316, the file number of a file to which each of the marks belongs, the recording time of the video data (GOP) corresponding to the mark, the position of an AAU corresponding to the GOP, contents of the recorded video data, and the priority of the data are recorded in a coordinated relationship with the position of the mark in the endless recording area, and the data are recorded in the descending order with regard to the positions of the marks. The mark management section 312 additionally writes, every time a mark is set newly and a GOP corresponding to the mark is recorded into the file, data corresponding to the set mark into the mark database 316 to update the mark database 316.

Then, when all of the files are filled with video data recorded therein and then one of the files is deleted in order to prepare a new file, the mark erasure section 314 erases a mark corresponding to the deleted file from the mark database 316. Then, after data corresponding to a mark set newly are additionally written, the mark database 316 is updated.

At this time, when a file is deleted, there is the possibility that audio data (AAUs) corresponding to the video data (GOPs) in the deleted file may remain in the endless recording area. If an AAU remains without being erased in this manner, then data only of audio sound free from a video image are outputted upon playback. Therefore, upon deletion of a file, the endless recording section 300 confirms based on the relationship between the GOPs and the corresponding AAUs recorded in the mark database 316 whether or not an AAU corresponding to an old GOP erased by overwriting remains. Then, if such an AUU remains, then the endless recording section 300 replaces the pertaining AAU into a padding stream.

The mark management section 312 prepares the mark data base 316 described above on the data memory 9 and secures a database recording area in the recording medium 12, and then records the mark database 316 temporarily recorded to the data memory 9 at predetermined intervals of time into the database recording area by overwriting. It is to be noted that setting of time intervals for overwriting of the mark database 316 into the data recording area is similar to that in the first embodiment described hereinabove, and therefore, description of such setting is omitted.

Now, the priority management section 311 and the file selection section 318 are described.

The priority management section 311 is means for setting a priority to video data in accordance with video contents, and, each time a mark is set by the mark setting section 313, the priority management section 311 classifies video data based on information of an EPG (Electric Program Guide), sets a priority determined in advance to each of the video data and automatically records such priorities into the mark database 316.

The file selection section 318 is means for selecting one of files into which video data are to be recorded by the endless recording section 300 in accordance with the priority. In order to delete, when a file is to be deleted, files in order beginning with a file in which video data whose priority is low are recorded, it is necessary that video data of an equal priority be recorded in the one file. Therefore, the file selection section 318 selects a file for recording in accordance with the priority so that only video data of an equal priority are recorded are recorded into one file.

For example, in the case illustrated in FIG. 25, video data of the priority 1 are recorded fully in the file 321, and video data of the priority 2 are recorded but not fully in the file 322.

At this time, if it is assumed that video data of the priority 3 are inputted newly, then the file selection section 318 selects not the file 322 but the file 323, and the endless recording section 300 records the video data into the thus selected file 323. On the other hand, if video data of the priority 1 are inputted newly, then the file selection section 318 selects not the file 322 or 323 but selects the different file 324. It is to be noted that, where a plurality of free files are present, the file selection section 318 records video data beginning with a file on the top address side of the endless recording area.

Then, if all files are filled up and it becomes necessary to delete an old file, then the file preparation section 315 deletes the old files in order beginning with a file in which video data having the lowest priority are recorded. Where a plurality of files in which video data whose priority is lowest are recorded are present, the files are successively deleted beginning with the oldest one. Also where no priority is set, files are deleted in order beginning with the oldest one similarly.

It is to be noted that, since the header recording section 301 and the video storage section 303 have similar functions to those of the header recording section 301 and the video storage section 303 in the first embodiment described hereinabove, description of them is omitted. Meanwhile, since the video playback section 302 has similar functions to those of the video playback section 202 of the third embodiment described hereinabove, description of it is omitted here.

Subsequently, operation upon endless recording of the endless recording video recording apparatus (digital video processing system) as the fourth embodiment of the present invention having such a configuration as described above is described with reference to a flow chart (steps F100 to F220) shown in FIG. 27. It is to be noted that, since operation upon playback is similar to that in the third embodiment, description of it is omitted here.

Figure 27:
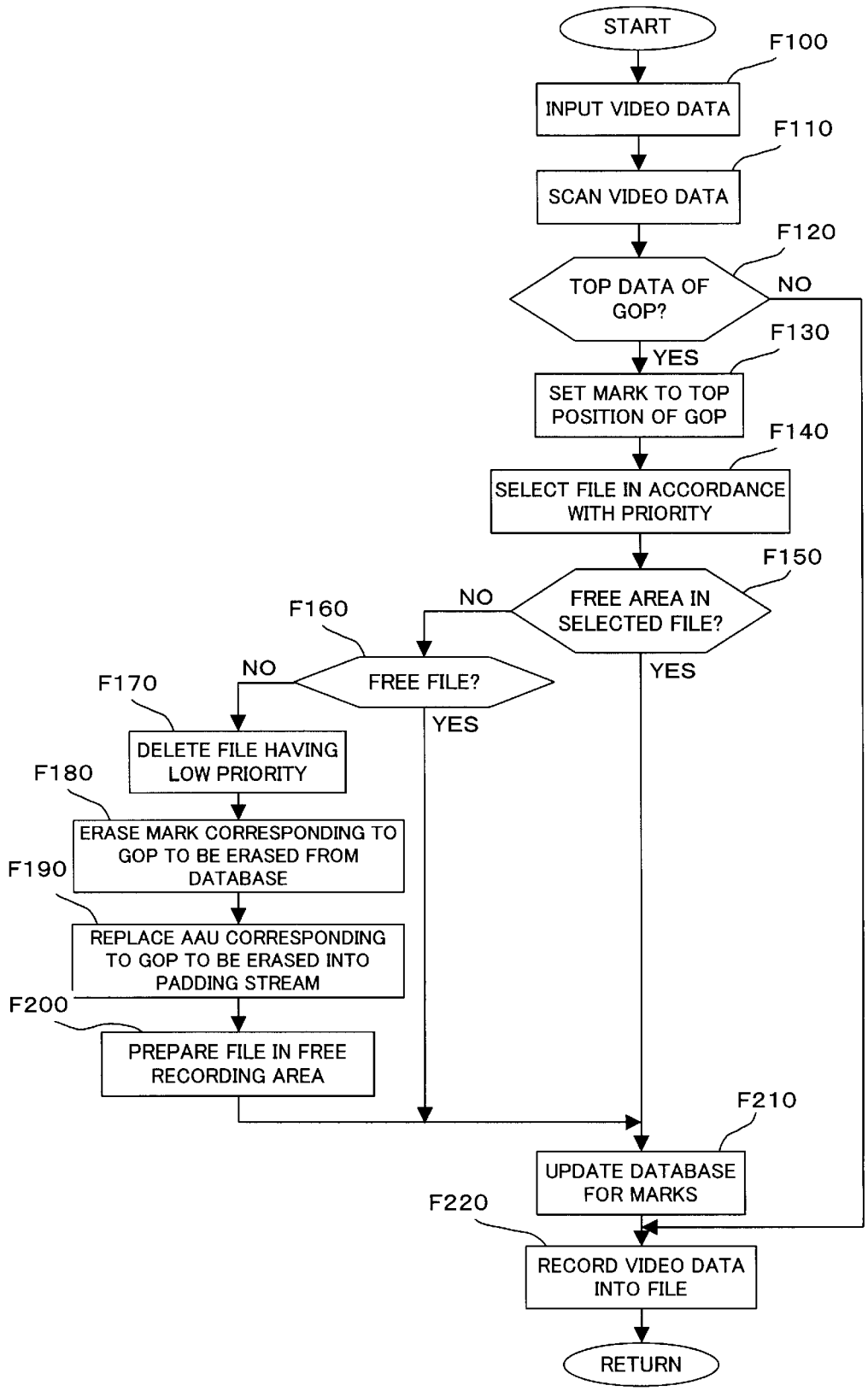
FIG. 27 is a flow chart illustrating operation upon endless recording by the endless video recording apparatus as the fourth embodiment of the present invention.
Figure 28:
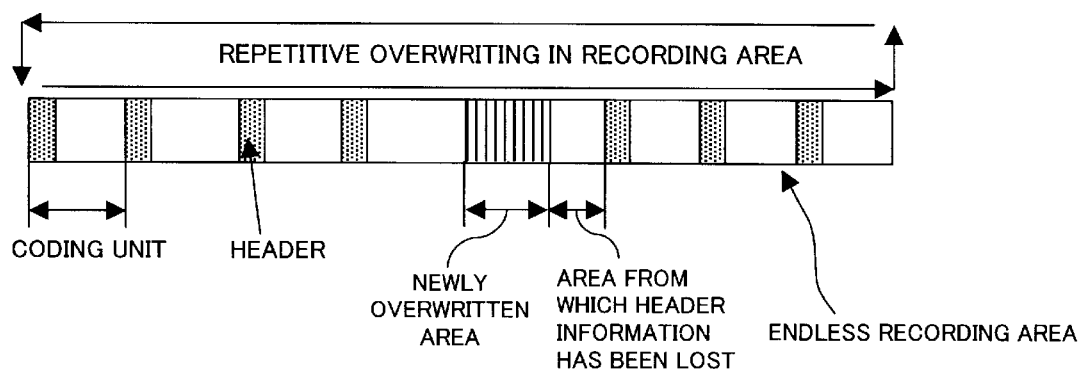
FIG. 28 is a schematic view illustrating conventional endless recording.

Upon endless recording, digitized video data are inputted to the endless recording section 300 through the video storage section 303 as seen in FIG. 27 (step F100). Then, the inputted video data are scanned (step F110), and it is discriminated whether or not the scanned video data are data to which a mark is to be set, that is, whether or not the scanned video data are top data of a GOP (step F120). At this time, if the scanned video data are not top data of a GOP (refer to the NO route of step F120), then the processing advances to step F220, in which the video data are recorded into a predetermined file.

On the other hand, if the scanned video data are top data of a GOP (refer to the YES route of step F120), then a mark is set to the top position of the GOP by the mark setting section 313 (step F130) Then, a file into which the video data are to be recorded is selected in accordance with the priority of the video image by the file selection section 318 (step F140).

Then, it is discriminated whether or not the selected file has a free area into which a GOP can be recorded newly (step F150), and if the selected file has a free area, then the processing advances to step F210 (refer to the YES route of step F150). Thus, the position of the mark in the endless recording area, the file number of the file to which the mark belongs, the recording time of the video data (GOP) corresponding to the mark, the position of an AAU corresponding to the GOP, contents of the recorded video data and the priority of the data are recorded into the mark database 316 to update the mark database 316 (step F210), and the video data are recorded into the selected file (step F220).

On the other hand, if the selected file does not have a free area (refer to the NO route of step F150), then it is discriminated whether or not there is a free file in which no video data are recorded as yet (step F160). If there is a free file (refer to the YES route of step F160), the processing advances to step F210, at which data corresponding to the mark set in the mark database 316 are recorded to update the mark database 316. Further, the video data are recorded into the free file (step F220).

If video data are recorded in all files and there is no free file (refer to the NO route of step F160), a file in which video data whose priority is lowest are recorded from among all files is deleted by the file preparation section 315. Where a plurality of files in which video data whose priority is lowest are recorded are present, the oldest one of the files is deleted (so far, step F170). Then, marks corresponding to GOPs included in the deleted file are deleted from the mark database 316 by the mark erasure section 314 (step F180) Further, it is confirmed based on the relationship between the GOPs and the corresponding AAUs recorded in the mark database 316 whether or not an AAU corresponding to an erased GOP remains. If such an AAU remains, then the pertaining AAU is replaced into a padding stream (step F190).

Then, a file is prepared newly in the area, from which the file has been deleted, by the file preparation section 315 (step F200), and after data corresponding to the set mark are recorded into the mark database 316 to update the mark database 316 at step F210, the video data are recorded into the newly prepared file (step F220). It is to be noted that, upon endless recording, information relating to an entire video image is stored by a process different from the process described above by the header recording section 301.

While operation upon endless recording of the endless video recording apparatus (digital video processing system) as the fourth embodiment of the present invention is described in detail above, as can be recognized from the foregoing description, with the present endless video recording apparatus (digital video processing system), even if GOPs which are particular units of video data have a dispersion in size, since an old GOP recorded formerly is erased fully by deletion of a file, any part of video data recorded formerly does not remain at all. Accordingly, there is an advantage that seamless video playback can be achieved without suffering from a disorder of video images which is caused by playback of destroyed video data. Further, there is an advantage also that endless recording can be continued without performing control in a mark unit or in a recording unit.

Further, since a mark is set for each GOP, the position of each GOP on the endless recording area can be searched readily by using a mark. Consequently, there is an advantage that a video image to be played back can be searched out readily and quickly. Furthermore, there is another advantage that, by continuously performing a search for a mark in the forward direction or the reverse direction from within the mark database 316, a fast feeding function and a rewinding function can be realized readily.

Further, since video data are recorded in a unit of a GOP into a file, there is an advantage also that it can be prevented that a single GOP is recorded divisionally into two files.

Furthermore, when a GOP is erased through deletion of a file, an AAU corresponding to the erased GOP is replaced into and recorded together with a padding stream based on the relationship between the GOPs and AAUs recorded in the mark database 316. Therefore, there is an advantage that it can be prevented that outputting of data only for audio sound free from video images which arises from the fact that an AAU corresponding to a GOP erased by overwriting remains can be prevented.

Further, with the present endless video recording apparatus (digital video processing system), when video data are recorded fully into the recording area for all files, a file in which video data whose priority is low are recorded is deleted and a new file is prepared. Therefore, there is an advantage that endless recording can be performed while those data which the user principally wants to enjoy are left preferentially.

Furthermore, where a plurality of files in which video data whose priority is equal are recorded are present, the files are deleted beginning with a file whose recording time is old. Therefore, there is an advantage also that a video image which has a higher priority and is newer can be left for a longer period of time.

In addition to the advantages described above, the present endless video recording apparatus (digital video processing system) has the following advantages similar to those of the first to third embodiments.

In particular, also with the present endless video recording apparatus (digital video processing system), the area for endless recording can be dynamically varied in accordance with a variation of the free area. Further, the endless recording area management section 310 normally supervises the area for endless recording and accepts an area releasing request from another application.

However, in the present embodiment, the area for endless recording is adjusted in a unit of a file, and for example, if the area which can be used for endless recording increases as a result of release of the area used by another application, then a file is prepared newly in the increased area. On the contrary if it is requested to release the endless recording area, a file having a low priority is deleted to release the recording area.

Accordingly, with the present endless video recording apparatus (digital video processing system), there is an advantage that the recording area in the recording medium 12 can be utilized efficiently and endless recording can be continued without disturbing execution of an important application. Further, where a predetermined area in the recording medium 12 is set as an endless recording area preferentially to a request from another application, there is an advantage that endless recording can be performed with certainty independently of the execution situation of the different application.

(e) Others

It is to be noted that the present invention is not limited to the embodiments described above but can be carried out in various forms without departing from the spirit and scope of the present invention.

For example, while, in the first embodiment described above, it is assumed that an area into which a new GOP is to be overwritten is the range of two GOPs including a GOP at which a set mark is positioned and then the area for the two GOPs is designated as an overwrite allowing area and a mark corresponding to any GOP in the designated overwrite allowing area is erased from the database 116, the designating method of an overwrite allowing area is not limited to this. For example, a range represented by a predetermined amount of data from the position of a set mark may be designated as an overwrite allowing area. In this manner, the designating method may be any method only if the overwrite allowing area is determined only based on the position of a set mark.

Further, in the first and second embodiments described above, video data of a GOP whose top portion has been erased by overwriting may be rewritten into a padding stream. In this instance, there is an advantage that, even if a playback allowing area is not set, seamless video playback can be performed without suffering from a disorder of video images which is caused by playback of destroyed video data.

Further, while, in the third embodiment described hereinabove, a padding stream is embedded into a free area in a recording unit in which a GOP is embedded, it is otherwise possible to keep such a free area (invalid data portion) as it is. In this instance, however, it is necessary to output the GOP to the video decoding section 7 after the invalid data portion is removed from the recording unit so that the GOP may be decoded by the video decoding section 7.

Further, in the fourth embodiment described above, it is possible, similarly as in the first to third embodiments, to set a recording term for each video data such that, when video data are recorded fully into recording areas of all files, a file in which video data whose priority is low are recorded from among those files in which recording data whose recording term has expired are recorded is deleted to prepare a new file. In this instance, there is an advantage that endless recording can be performed while a file which includes those data whose degree of freshness of information is high and whose priority of video contents is high are left preferentially.

Further, while, in the embodiments described hereinabove, a GOP is used as a particular unit for video data, two or more GOPs may be combined into a single unit to be handled as a particular unit, and further, a unit of one or more AAUs or a unit of a combination of a GOP or GOPs and an AAU or AAUs may be used as a particular unit.

Furthermore, while, in the embodiment described above, a case wherein video data are coded by the MPEG system is described, the coding system is not limited to the MPEG system, but the endless video recording apparatus of the present invention is ready for video data coded using various systems.

INDUSTRIAL APPLICABILITY OF THE INVENTION

As described above, an endless video recording apparatus of the present invention is useful for endless recording of digital video images and is particularly suitable for endless recording of digital video images coded using the MPEG which is an international standard of the moving picture coding system.

What is claimed is:

1. An endless video recording apparatus, characterized in that it comprises:

video data recording means (100) for recording video data coded in accordance with the MPEG system for each particular unit formed from at least one or more GOPs into an endless recording area secured in a recording medium (12) and recording, where video data are recorded fully in the endless recording area, new video data in an overwriting relationship on the video data recorded formerly in the endless recording area;

mark setting means (113) for setting marks to the particular units;

mark management means (112) for recording the positions of the marks, the sizes of the particular units corresponding to the marks and the positions of AAUs corresponding to the GOPs, which form the particular units, in a coordinated relationship with the marks into a database (116);

mark erasure means (114) for erasing a mark corresponding to an old particular unit which overlaps with an area into which a new particular unit should be recorded from said database (116); and playback allowing area setting means (115) for referring to said database (116) to set a playback allowing area; and that, when a mark is erased by said mark erasure means (114), said video data recording means (100) rewrites an AAU corresponding to the erased mark into a padding stream based on the relationship between the marks and the AAUs recorded in said database (116) and records the padding stream.

2. The endless video recording apparatus as set forth in claim 1, characterized in that said mark erasure means (114) sets a predetermined range with respect to the position of one of the set marks as an overwrite allowing area and erases a mark or marks included in the set overwrite allowing area from within said database (116).

3. The endless video recording apparatus as set forth in claim 1, characterized in that said mark erasure means (114) specifies an area into which the new particular unit is to be recorded based on the positions of the marks and the size of the new particular unit and erases a mark or marks included in the specified area from within said database (116).

4. The endless video recording apparatus as set forth in claim 1, characterized in that said playback allowing area setting means (115) sets an area from the mark whose recording time is oldest to the last end of a particular unit corresponding to the mark whose recording time is newest as the playback allowing area.

5. The endless video recording apparatus as set forth in claim 1, characterized in that a database recording area is secured in said recording medium (12), and said mark management means (112; 212; 312) records said database (116; 216; 316) at predetermined intervals of time into the database recording area.

6. The endless video recording apparatus as set forth in claim 1, characterized in that a database recording area is secured in said recording medium (12), and said mark management means (112; 212; 312) records said database (116; 216; 316) once into temporary recording means (9) and records said database (116; 216; 316) into the database recording area when said database (116; 216; 316) is updated by a predetermined number of times in said temporary recording means (9).

7. The endless video recording apparatus as set forth in claim 1, characterized in that a database recording area is secured in said recording medium (12), and said mark management means (112; 212; 312) records, during endless recording, said database (116; 216; 316) into temporary recording means (9) and records said database (116; 216; 316) into the database recording area at a point of time when the endless recording is completed.

8. The endless video recording apparatus as set forth in claim 1, characterized in that it comprises video playback means (102; 202; 302) for searching for a playback starting point in a unit of a mark from within said database (116; 216; 316) and reading out video data of a particular unit corresponding to the searched out mark from the endless recording area to start playback of the video data.

9. The endless video recording apparatus as set forth in claim 1, characterized in that it comprises endless recording area setting means (110; 210; 310) for dynamically and adjustably setting the endless recording area in accordance with increase or decrease of the free area in said recording medium (12).

10. The endless video recording apparatus as set forth in claim 9, characterized in that, when a releasing request is received from another application, said endless recording area setting means (110; 210; 310) releases the endless recording area in accordance with the releasing request.

11. The endless video recording apparatus as set forth in claim 1, characterized in that it comprises endless recording area setting means (110; 210; 310) for setting a predetermined area in said recording medium (12) as the endless recording area preferentially to a request from any other application.

12. The endless video recording apparatus as set forth in claim 1, characterized in that it comprises header recording area setting means (101; 201; 301) for setting a header recording area into which basic information of recorded video images should be recorded in said recording medium (12) separately from the, endless recording area.

13. The endless video recording apparatus as set forth in claim 1, characterized in that it comprises priority setting means (111; 211) for setting, for each of video contents, a priority with which a record of the video contents should be left, that said mark management means (112; 212) records the priorities set by said priority setting means (111; 211) in a corresponding relationship to the marks into said database (116; 216), and that said video data recording means (100; 200) searches, where video data are recorded fully in the endless recording area, for a mark corresponding to video contents having a low priority from within said database (116; 216) and records new video data in an overwriting relationship on the video data corresponding to the searched out mark.

14. The endless video recording apparatus as set forth in claim 13, characterized in that, where a plurality of video data having an equal priority are recorded, said video data recording means (100; 200) overwrites the new video data on the video data of the equal priority beginning with the video data whose recording time is old.

15. The endless video recording apparatus as set forth in claim 14, characterized in that said mark management means (112; 212) further records recording terms of the recorded video data in a corresponding relationship to the marks into said database (116; 216), and, where video data are recorded fully in the endless recording area, said video data recording means (100; 200) searches for a mark corresponding to video contents having a low priority among those video data whose recording term has expired from within said database (116; 216) and records the new video data in an overwriting relationship on the video data corresponding to the searched out mark.

16. The endless video recording apparatus as set forth in claim 2, characterized in that said playback allowing area setting means (115) sets an area from the mark whose recording time is oldest to the last end of a particular unit corresponding to the mark whose recording time is newest as the playback allowing area.

17. The endless video recording apparatus as set forth in claim 3, characterized in that said playback allowing area setting means (115) sets an area from the mark whose recording time is oldest to the last end of a particular unit corresponding to the mark whose recording time is newest as the playback allowing area.

18. An endless video recording apparatus, characterized in that it comprises:

video decomposition means (215) for decomposing video data coded in accordance with the MPEG system for each particular unit formed from at least one or more GOPs;

video data recording means (200) for embedding the decomposed video data into recording units of a particular size and recording the recording units into an endless recording area secured in a recording medium (12) and for recording, where the recording units are recorded fully in the endless recording area, a new recording unit in an overwriting relationship on one of the recording units recorded formerly in the endless recording area; and a database (216) in which a relationship between GOPs recorded in the recording units and AAUs corresponding to the GOPs is recorded; and that, when a GOP recorded in an old recording unit is erased by overwriting recording on a recording unit in which new video data are embedded, said video data recording means (200) rewrites an AAU corresponding to the erased GOP into a padding stream based on the relationship between the GOPs and the AAUs recorded in said database (216) and records the padding stream.

19. The endless video recording apparatus as set forth in claim 18, characterized in that said video data recording means (200) embeds a padding stream into a free area in each of the recording units in which the decomposed video data are embedded and records the resulting recording units.

20. The endless video recording apparatus as set forth in claim 18, characterized in that it comprises:

mark setting means (213) for setting a mark for each of the particular units;

mark management means (212) for coordinating the relationship between the GOPs and the AAUs corresponding to the GOPs with the marks and recording the positions of the marks in the endless recording area into said database (216); and mark erasure means (214) for erasing a mark corresponding to old video data which are to be erased by overwriting recording of a recording unit in which new video data are embedded from within said database (216).

21. The endless video recording apparatus as set forth in claim 6, characterized in that it comprises:

mark setting means (213) for setting a mark for each of the particular units;

mark management means (212) for coordinating the relationship between the GOPs and the AAUs corresponding to the GOPs with the marks and recording the positions of the marks in the endless recording area into said database (216); and mark erasure means (214) for erasing a mark corresponding to old video data which are to be erased by overwriting recording of a recording unit in which new video data are embedded from within said database (216).

22. An endless video recording apparatus, characterized in that it comprises:

file preparation means (315) for preparing a plurality of files in an endless recording area secured in a recording medium (12);

video data recording means (300) for successively recording video data coded in accordance with the MPEG system in a particular unit formed from at least more than one GOP for each of the files; and a database (316) in which a relationship between the GOPs recorded in the files and AAUs corresponding to the GOPs is recorded; that, when video data are recorded fully into the recording areas of all of the files, said file preparation means (315) deletes one of the plurality of files and prepares a new file; and that, when one of the files is deleted, said video data recording means (300) rewrites an AAU corresponding to a GOP erased upon the deletion of the file into a padding stream based on the relationship between the GOPs and the AAUs recorded in said database and records the padding stream.

23. The endless video recording apparatus as set forth in claim 22, characterized in that it comprises:

mark setting means (313) for setting a mark to the video data to be recorded for each particular unit; and mark management means (312) for recording the positions of the marks in the endless recording area into said database (316).

24. The endless video recording apparatus as set forth in claim 22, characterized in that it comprises:

priority setting means (311) for setting, for each of video contents, a priority with which a record of the video contents should be left; and file selection means (318) for selecting a file into which the inputted video data should be recorded in accordance with the priority set by said priority setting means (311), that said video data recording means (300) records the video data into the file selected by said file selection means (318), and that, when video data are recorded fully in the recording areas of all of the files, said file preparation means (315) deletes a file in which video data having a low priority are recorded and prepares a new file.

* * * * *